United States Patent
Kang et al.

(10) Patent No.: US 8,130,714 B2
(45) Date of Patent: Mar. 6, 2012

(54) METHOD AND APPARATUS FOR TRANSMITTING SIGNAL IN A WIRELESS COMMUNICATION SYSTEM

(75) Inventors: Seung Hyun Kang, Anyang-si (KR); Han Gyu Cho, Anyang-si (KR); Jin Sam Kwak, Anyang-si (KR); Jin Soo Choi, Anyang-si (KR); Sung Ho Moon, Anyang-si (KR)

(73) Assignee: LG Electronics, Seoul (KR)

( * ) Notice: Subject to any disclaimer, the term of this patent is extended or adjusted under 35 U.S.C. 154(b) by 253 days.

(21) Appl. No.: 12/582,159

(22) Filed: Oct. 20, 2009

(65) Prior Publication Data

US 2010/0111014 A1 May 6, 2010

Related U.S. Application Data

(60) Provisional application No. 61/106,613, filed on Oct. 20, 2008, provisional application No. 61/109,157, filed on Oct. 28, 2008, provisional application No. 61/109,187, filed on Oct. 29, 2008, provisional application No. 61/109,184, filed on Oct. 29, 2008, provisional application No. 61/110,997, filed on Nov. 4, 2008, provisional application No. 61/112,769, filed on Nov. 9, 2008, provisional application No. 61/121,556, filed on Dec. 11, 2008, provisional application No. 61/157,915, filed on Mar. 6, 2009, provisional application No. 61/157,916, filed on Mar. 6, 2009.

(30) Foreign Application Priority Data

May 11, 2009 (KR) .................. 10-2009-0040778
Sep. 18, 2009 (KR) .................. 10-2009-0088531

(51) Int. Cl.
*H04W 4/00* (2009.01)
(52) U.S. Cl. ........................................................ 370/329
(58) Field of Classification Search .................. 370/329, 370/341–348; 455/450, 464, 509
See application file for complete search history.

(56) References Cited

U.S. PATENT DOCUMENTS

| | | |
|---|---|---|
| 5,243,596 A | 9/1993 | Port et al. |
| 2002/0159423 A1* | 10/2002 | Yao et al. ....................... 370/342 |
| 2005/0044206 A1 | 2/2005 | Johansson et al. |
| 2005/0265227 A1 | 12/2005 | Byun et al. |
| 2006/0083210 A1 | 4/2006 | Li et al. |
| 2007/0049199 A1 | 3/2007 | Lim et al. |
| 2007/0061433 A1 | 3/2007 | Reynolds et al. |
| 2008/0298492 A1* | 12/2008 | Hwang et al. ................. 375/260 |
| 2009/0010238 A1* | 1/2009 | Barak et al. ................... 370/342 |
| 2009/0285168 A1* | 11/2009 | Choi et al. ..................... 370/329 |

* cited by examiner

*Primary Examiner* — Derrick Ferris
*Assistant Examiner* — Mang Yeung
(74) *Attorney, Agent, or Firm* — McKenna Long & Aldridge LLP

(57) ABSTRACT

A method and apparatus for transmitting a signal in a wireless communication system are disclosed. The signal transmission method includes generating encoded packet data for transmission on an uplink, setting distributed resources in a plurality of contiguous subframes, and transmitting at least part of the encoded packet data through the distributed resources to a base station. The distributed resources are interleaved on a subframe basis according to a permutation pattern and the permutation pattern is different for each subframe.

24 Claims, 19 Drawing Sheets

FIG. 10A

| 0 | 1 | 2 | 3 | 4 |
|---|---|---|---|---|
| 5 | 6 | 7 | 8 | 9 |
| 10 | 11 | 12 | 13 | 14 |
| 15 | 16 | 17 | 18 | 19 |
| 20 | 21 | 22 | 23 | 24 |
| 25 | 26 | 27 | 28 | 29 |
| 30 | 31 | 32 | 33 | 34 |
| 35 | 36 | 37 | 38 | 39 |

Row-wise index writing

FIG. 10B

| 0 | 3 | 1 | 4 | 2 |
|---|---|---|---|---|
| 3 | 1 | 4 | 2 | 0 |
| 1 | 4 | 2 | 0 | 3 |
| 4 | 2 | 0 | 3 | 1 |
| 2 | 0 | 3 | 1 | 4 |
| 0 | 3 | 1 | 4 | 2 |
| 3 | 1 | 4 | 2 | 0 |
| 1 | 4 | 2 | 0 | 3 |

| 0 | 3 | 1 | 4 | 2 |
|---|---|---|---|---|
| 8 | 6 | 9 | 7 | 5 |
| 11 | 14 | 12 | 10 | 13 |
| 19 | 17 | 15 | 18 | 16 |
| 22 | 20 | 23 | 21 | 24 |
| 25 | 28 | 26 | 29 | 27 |
| 33 | 31 | 34 | 32 | 30 |
| 36 | 39 | 37 | 35 | 38 |

(a) Intra-row permutation pattern    (b) Result of intra-row permutation

FIG. 10C

| 0 | 7 | 6 | 5 | 4 |
|---|---|---|---|---|
| 5 | 4 | 3 | 2 | 1 |
| 2 | 1 | 0 | 7 | 6 |
| 7 | 6 | 5 | 4 | 3 |
| 4 | 3 | 2 | 1 | 0 |
| 1 | 0 | 7 | 6 | 5 |
| 6 | 5 | 4 | 3 | 2 |
| 3 | 2 | 1 | 0 | 7 |

| 0 | 39 | 34 | 29 | 24 |
|---|----|----|----|----|
| 25 | 20 | 15 | 10 | 5 |
| 11 | 6 | 1 | 35 | 30 |
| 36 | 31 | 26 | 21 | 16 |
| 22 | 17 | 12 | 7 | 2 |
| 8 | 3 | 37 | 32 | 27 |
| 33 | 28 | 23 | 18 | 13 |
| 19 | 14 | 9 | 4 | 38 |

(a) Intra-row column pattern    (b) Result of intra-column permutation

FIG. 12

FIG. 16
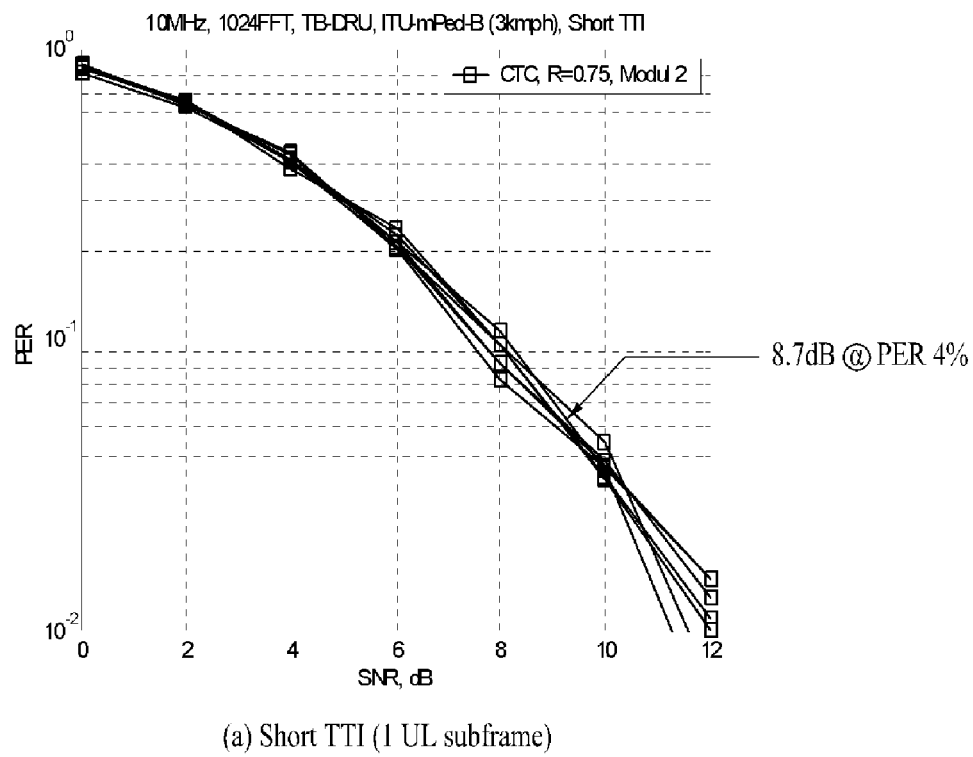
(a) Short TTI (1 UL subframe)
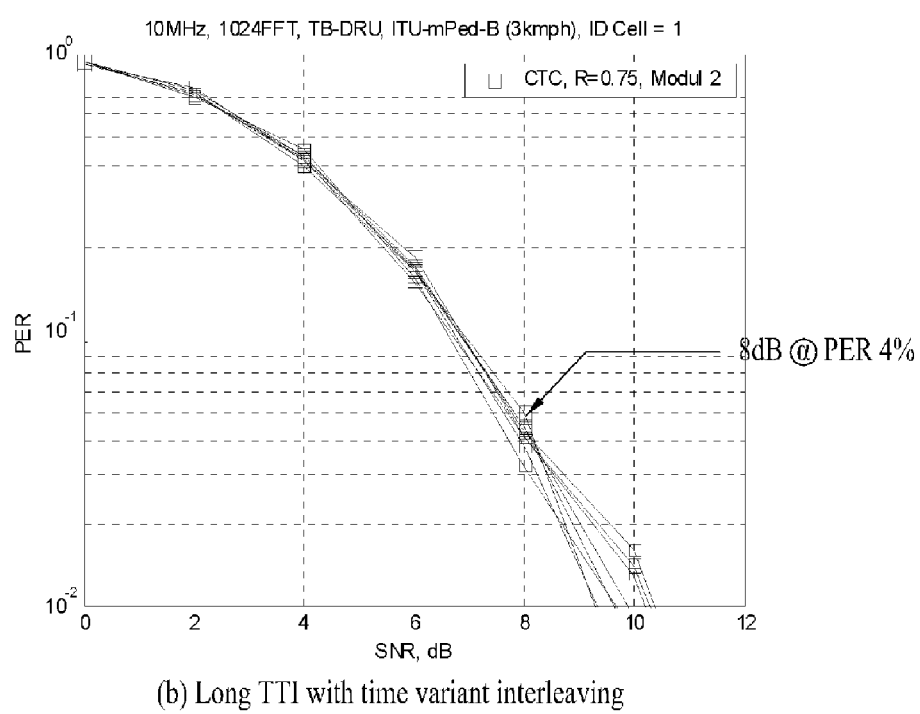
(b) Long TTI with time variant interleaving

FIG. 17

Example of random sequence generation function output

| IDCell | [1] | [2] | [3] | [4] | [5] | [6] | [7] | [8] | [9] | [10] | [11] | [12] |
|---|---|---|---|---|---|---|---|---|---|---|---|---|
| 0 | 10 | 7 | 9 | 11 | 12 | 8 | 6 | 5 | 4 | 3 | 2 | 1 |
| 1 | 12 | 1 | 2 | 3 | 4 | 5 | 6 | 7 | 8 | 9 | 10 | 11 |
| 2 | 2 | 4 | 8 | 10 | 6 | 11 | 12 | 5 | 7 | 9 | 1 | 3 |
| 3 | 12 | 10 | 5 | 11 | 9 | 3 | 2 | 1 | 4 | 8 | 7 | 6 |
| 4 | 6 | 8 | 9 | 7 | 11 | 12 | 10 | 1 | 2 | 3 | 4 | 5 |
| 5 | 3 | 1 | 7 | 5 | 12 | 9 | 10 | 11 | 2 | 4 | 6 | 8 |
| 6 | 9 | 7 | 6 | 10 | 12 | 8 | 5 | 4 | 3 | 2 | 1 | 11 |
| 7 | 3 | 1 | 4 | 5 | 6 | 7 | 8 | 9 | 10 | 11 | 12 | 2 |
| 8 | 2 | 6 | 4 | 10 | 8 | 11 | 12 | 3 | 5 | 7 | 9 | 1 |
| 9 | 10 | 11 | 8 | 9 | 3 | 2 | 1 | 12 | 7 | 6 | 5 | 4 |
| 10 | 6 | 5 | 4 | 8 | 3 | 2 | 1 | 9 | 10 | 11 | 12 | 7 |
| 11 | 3 | 1 | 7 | 5 | 9 | 10 | 11 | 12 | 8 | 2 | 4 | 6 |
| 12 | 8 | 7 | 12 | 6 | 11 | 5 | 4 | 3 | 2 | 1 | 10 | 9 |
| 13 | 8 | 12 | 7 | 10 | 9 | 11 | 6 | 5 | 4 | 3 | 2 | 1 |
| 14 | 8 | 9 | 11 | 12 | 4 | 5 | 6 | 7 | 10 | 1 | 2 | 3 |
| 15 | 9 | 7 | 8 | 11 | 12 | 1 | 10 | 6 | 5 | 4 | 3 | 2 |
| 16 | 4 | 3 | 6 | 2 | 1 | 7 | 8 | 9 | 10 | 11 | 12 | 5 |
| 17 | 10 | 12 | 9 | 11 | 1 | 2 | 3 | 4 | 5 | 6 | 7 | 8 |
| 18 | 11 | 5 | 10 | 12 | 6 | 4 | 3 | 2 | 1 | 9 | 8 | 7 |
| 19 | 8 | 7 | 6 | 11 | 9 | 5 | 4 | 3 | 2 | 1 | 12 | 10 |
| 20 | 11 | 12 | 2 | 3 | 4 | 5 | 6 | 7 | 8 | 9 | 10 | 1 |
| 21 | 5 | 1 | 7 | 3 | 10 | 9 | 11 | 12 | 2 | 8 | 6 | 4 |
| 22 | 2 | 4 | 1 | 5 | 6 | 7 | 8 | 9 | 10 | 11 | 12 | 3 |
| 23 | 12 | 11 | 8 | 9 | 7 | 10 | 1 | 2 | 3 | 4 | 5 | 6 |
| 24 | 2 | 12 | 4 | 8 | 6 | 10 | 11 | 7 | 5 | 3 | 1 | 9 |
| 25 | 6 | 9 | 5 | 7 | 4 | 3 | 2 | 1 | 10 | 11 | 12 | 8 |
| 26 | 12 | 1 | 2 | 3 | 4 | 5 | 6 | 7 | 8 | 9 | 10 | 11 |
| 27 | 3 | 7 | 5 | 1 | 10 | 9 | 11 | 12 | 8 | 6 | 4 | 2 |
| 28 | 11 | 9 | 4 | 10 | 3 | 2 | 1 | 12 | 8 | 7 | 6 | 5 |
| 29 | 7 | 9 | 8 | 11 | 12 | 5 | 6 | 10 | 1 | 2 | 3 | 4 |
| 30 | 2 | 8 | 4 | 12 | 6 | 11 | 10 | 5 | 3 | 1 | 9 | 7 |
| 31 | 9 | 7 | 6 | 12 | 11 | 8 | 5 | 4 | 3 | 2 | 1 | 10 |

▨ : A part overlapped between cells

▩ : A part is in order

FIG. 19
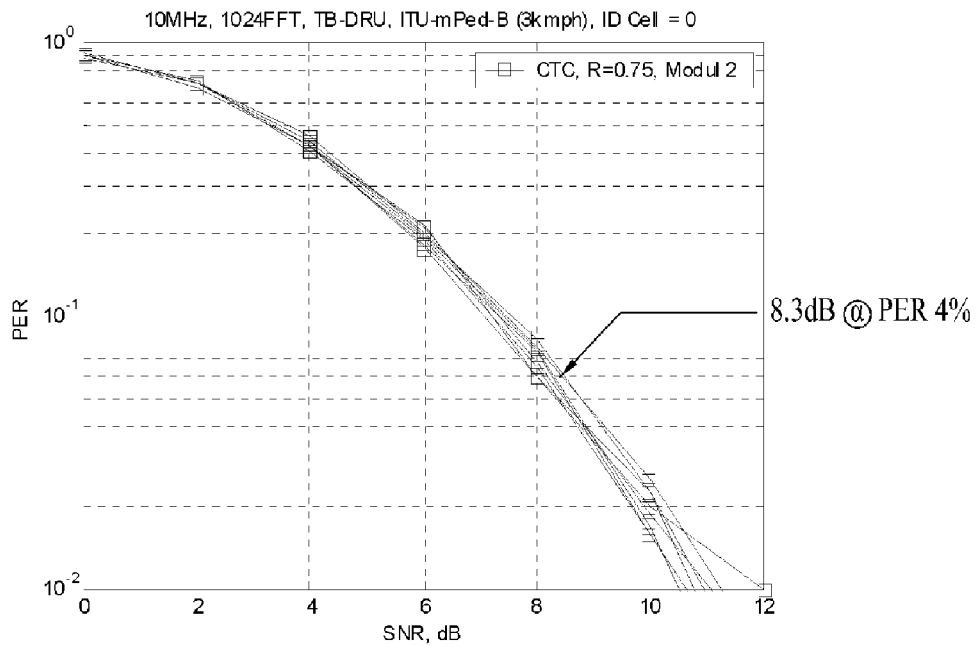
(a) Long TTI with time variant interleaving_1
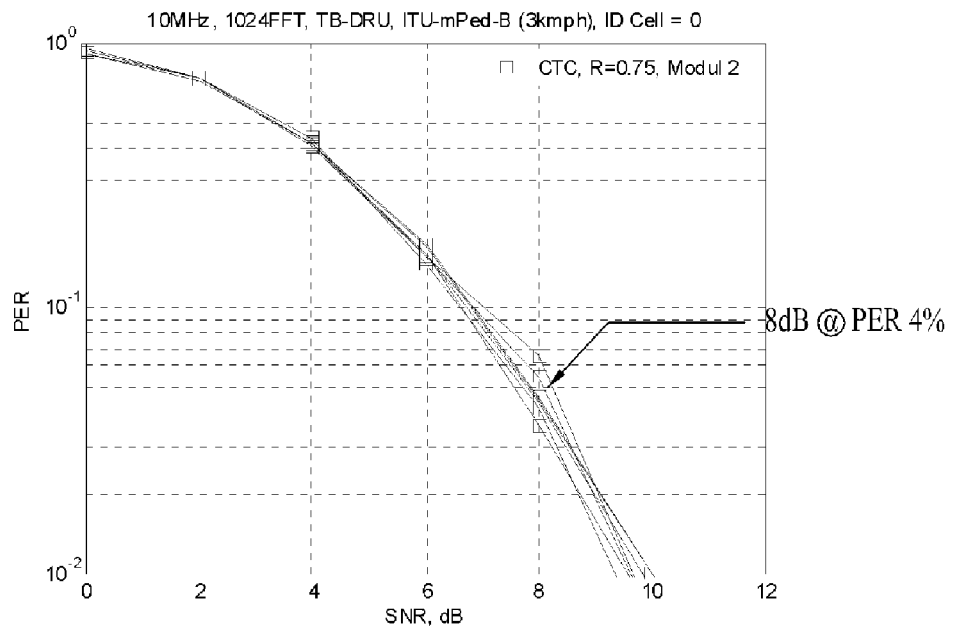
(b) Long TTI with time variant interleaving_2

METHOD AND APPARATUS FOR TRANSMITTING SIGNAL IN A WIRELESS COMMUNICATION SYSTEM

This application claims the benefit of U.S. provisional application 61/106,613, filed on Oct. 20, 2008, U.S. provisional application 61/109,157, filed on Oct. 28, 2008, U.S. provisional application 61/109,187, filed on Oct. 29, 2008, U.S. provisional application 61/109,184, filed on Oct. 29, 2008, U.S. provisional application 61/110,997, filed on Nov. 4, 2008, U.S. provisional application 61/112,769, filed on Nov. 9, 2008, U.S. provisional application 61/121,556, filed on Dec. 11, 2008, U.S. provisional application 61/157,915, filed on Mar. 6, 2009, U.S. provisional application 61/157,916, filed on Mar. 6, 2009, Korean Patent Application No. 10-2009-0040778, filed on May 11, 2009, and Korean Patent Application No. 10-2009-0088531, filed on Sep. 18, 2009, which are hereby incorporated by reference for all purposes as if fully set forth herein.

BACKGROUND OF THE INVENTION

1. Field of the Invention

The present invention relates to a wireless communication system, and more particularly, to a method and apparatus for transmitting a signal in a wireless communication system.

2. Discussion of the Related Art

FIG. 1 is a diagram illustrating the configuration of an exemplary wireless communication system.

Referring to FIG. 1, a wireless communication system 100 includes a plurality of Base Stations (BSs) 110a, 110b and 110c and a plurality of User Equipments (UEs) 120a to 120i. The wireless communication system 100 may include homogeneous networks or heterogeneous networks. Heterogeneous networks refer to networks in which different network entities coexist, such as a macro cell, a femto cell, a pico cell, a relay station, etc. A BS is usually a fixed station that communicates with UEs. Each BS 110a, 110b or 110c provides services to its specific geographical area 102a, 102b or 102c. For the purpose of improving system performance, the specific service area of the BS may further be divided into a plurality of smaller areas 104a, 104b and 104c. These smaller areas may be called cells, sectors or segments. In an Institute of Electrical and Electronics Engineers (IEEE) 802.16 system, cell Identities (IDs) (Cell_IDs or IDCells) are assigned from the perspective of a whole system, whereas sector IDs or segment IDs are assigned from the perspective of the service coverage of each BS, ranging from 0 to 2. The UEs 120a to 120i, which are mobile or fixed, are generally distributed over the wireless communication system 100. Each UE may communicate with at least one BS on a downlink and an uplink at a point of time. The communication may be conducted in Frequency Division Multiple Access (FDMA), Time Division Multiple Access (TDMA), Code Division Multiple Access (CDMA), Single Carrier-FDMA (SC-FDMA), Multi Carrier-FDMA (MC-FDMA), Orthogonal Frequency Division Multiple Access (OFDMA), or a combination of them. Herein, a downlink refers to a communication link directed from a BS to a UE and an uplink refers to a communication link directed from the UE to the BS.

FIG. 2 illustrates an exemplary channel change in frequency in the wireless communication system.

Referring to FIG. 2, if a system band has a bandwidth greater than a coherence bandwidth, a channel may fluctuate greatly in the system band. Then a frequency diversity gain may be achieved by spreading a transmission signal across all or part of the system band along the frequency axis. For example, allocation of frequency resources to the transmission signal by appropriate permutation may lead to mixing and spreading of the transmission signal across a predetermined bandwidth. Accordingly, there exists a continuous need for a permutation scheme to effectively distribute a transmission signal across a predetermined bandwidth.

SUMMARY OF THE INVENTION

Accordingly, the present invention is directed to a method and apparatus for transmitting a signal in a wireless communication system that substantially obviates one or more problems due to limitations and disadvantages of the related art.

An object of the present invention is to provide a method and apparatus for transmitting a signal in a wireless communication system.

Another object of the present invention is to provide a permutation method and apparatus for increasing a diversity gain in transmitting a signal.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for transmitting data by a user equipment in a wireless communication system includes generating encoded packet data for transmission on an uplink, setting distributed resources across a plurality of contiguous subframes, and transmitting at least part of the encoded packet data through the distributed resources to a base station. The distributed resources are interleaved on a subframe basis according to a permutation pattern and the permutation pattern is different for each subframe.

In another aspect of the present invention, a user equipment includes a Radio Frequency (RF) module for transmitting a signal through distributed resources from a base station, and a processor for processing the signal. The processor is adapted to perform a data processing method including generating encoded packet data for transmission on an uplink, setting distributed resources across a plurality of contiguous subframes, and transmitting at least part of the encoded packet data through the distributed resources to a base station. The distributed resources are interleaved on a subframe basis according to a permutation pattern and the permutation pattern is different for each subframe.

In another aspect of the present invention, a method for processing data by a base station in a wireless communication system includes receiving a signal through distributed resources set in a plurality of contiguous subframes from a user equipment, deinterleaving the distributed resources on a subframe basis according to a permutation pattern, and decoding data in the deinterleaved distributed resources. The permutation pattern is different for each subframe.

In a further aspect of the present invention, a base station includes an RF module for receiving a signal through distributed resources from a user equipment and a processor for processing the received signal. The processor is adapted to perform a data processing method including receiving a signal through distributed resources set in a plurality of contiguous subframes from the user equipment, deinterleaving the distributed resources on a subframe basis according to a permutation pattern, and decoding data in the deinterleaved distributed resources. The permutation pattern is different for each subframe.

The distributed resources may include one or more Distributed Resource Units (DRUs).

The interleaving may be performed on a tile basis in a subframe.

The permutation pattern may be set to be different for each subframe using an index of the subframe. In this case, the permutation pattern may be set to be different for each subframe using a product between the subframe index and a prime number.

The subframe index may be used as one of a cyclic shift value and a masking value for the permutation pattern.

The permutation pattern may be generated using at least one of time-variant intra-row permutation and time-variant intra-column permutation.

The permutation pattern may be generated by the following equation, $$\text{Tile}(s,n,t) = L_{DRU,FPi} \times n + g(\text{PermSeq}(\ ),s,n,t)$$

where Tile(s,n,t) denotes a physical tile index of an $n^{th}$ tile in an $s^{th}$ Distributed Logical Resource Unit (DLRU) of a $t^{th}$ subframe, $L_{DRU,FPi}$ denotes the number of DRUs in an $i^{th}$ frequency partition, g(PermSeq( ),s,n,t) denotes a permutation sequence of length $L_{DRU,FPi}$, and PermSeq( ) denotes a base permutation sequence of length $L_{DRU,FPi}$.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings:

FIGS. 10A, 10B and 10C illustrate an exemplary permutation based on block interleaving.

FIG. 12 illustrates an exemplary permutation that is performed taking time into account according to the embodiment of the present invention.

FIG. 16 illustrates simulation results according to an embodiment of the present invention.

FIG. 17 illustrates an exemplary output result of a random sequence generation function.

FIG. 19 illustrates simulation results according to an embodiment of the present invention.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts. Embodiments of the present invention are examples in which the technical features of the present invention are applied to a system using a plurality of orthogonal subcarriers. While the present invention is described in the context of an Institute of Electronics and Electrical (IEEE) 802.16 system by way of example, it is also applicable to a variety of wireless communication systems including a $3^{rd}$ Generation Partnership Project (3GPP) system.

Figure 1:
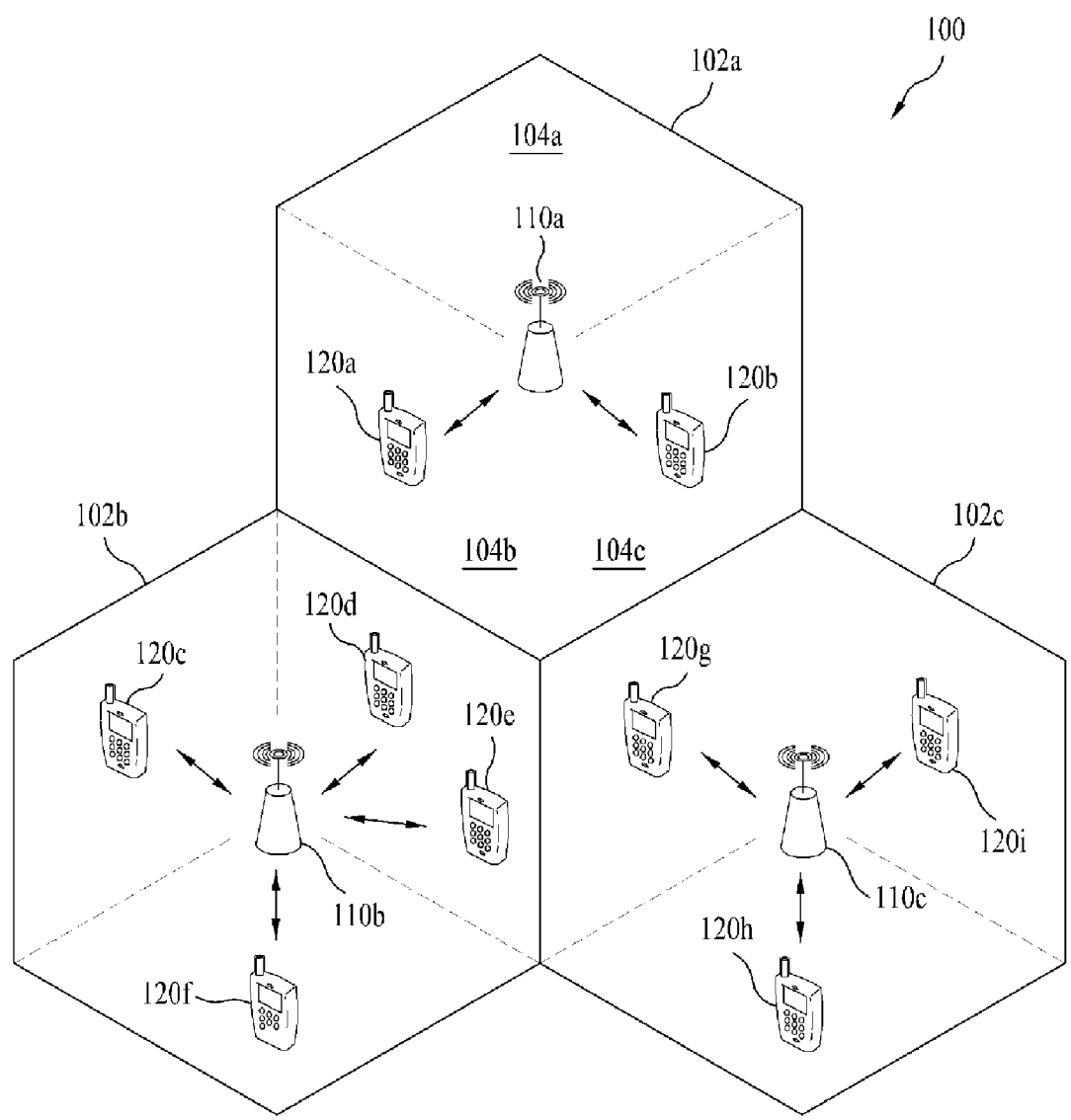
FIG. 1 is a diagram illustrating the configuration of an exemplary wireless communication system.
Figure 2:
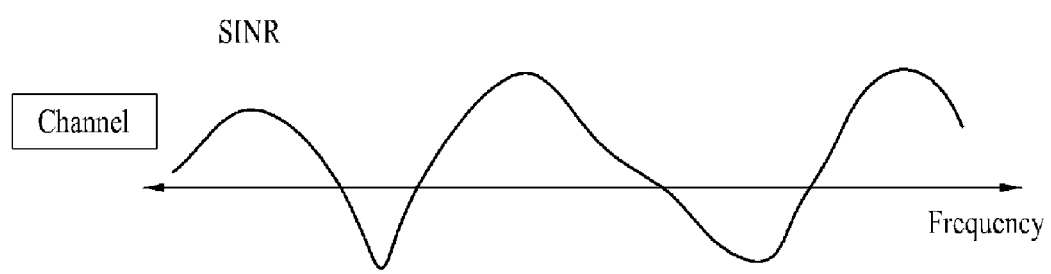
FIG. 2 illustrates an exemplary channel change in frequency in the wireless communication system.
Figure 3:
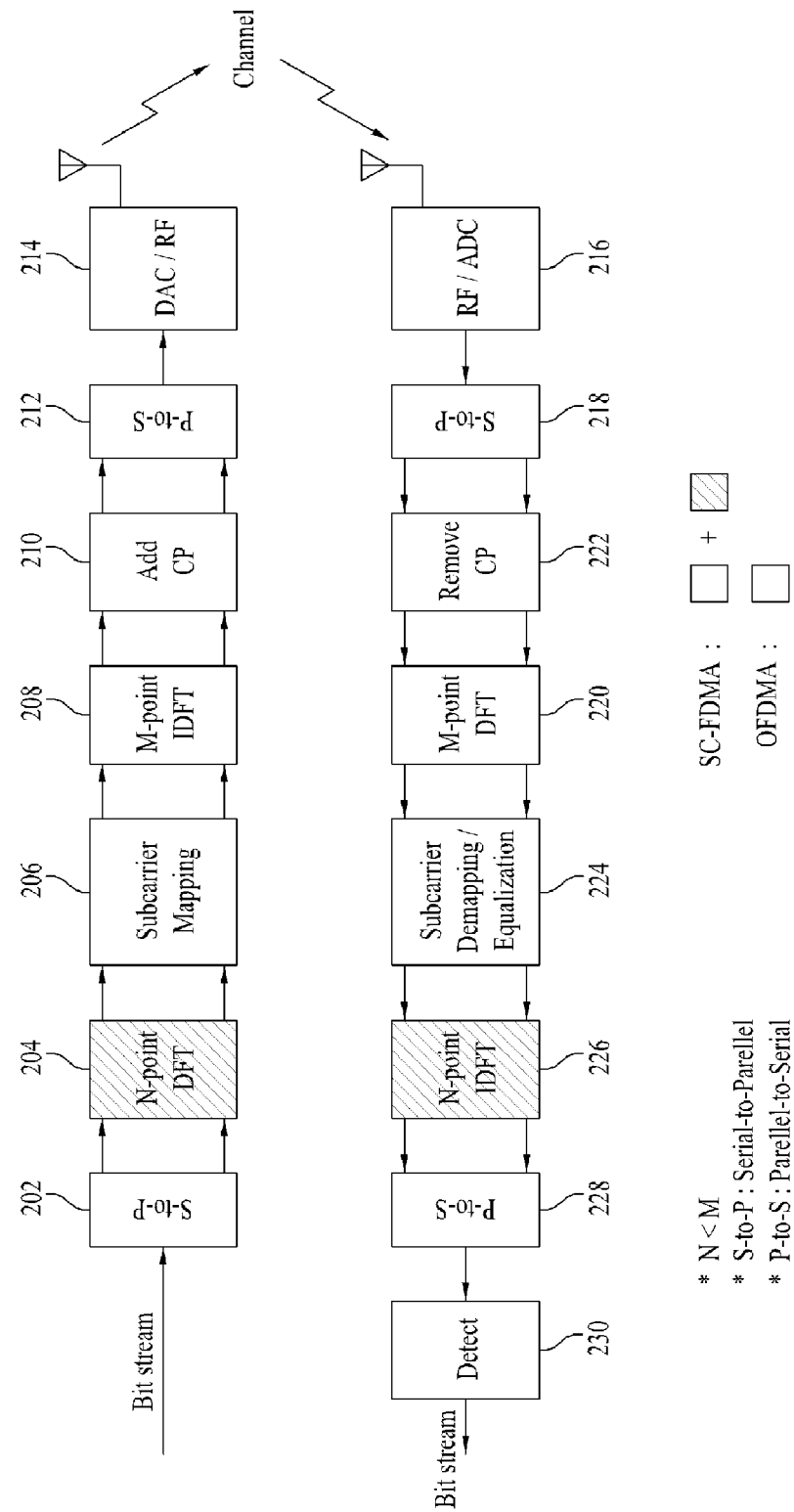
FIG. 3 is a block diagram of an exemplary Orthogonal Frequency Division Multiple Access (OFDMA) transmitter and receiver and an exemplary Single Carrier-Frequency Division Multiple Access (SC-FDMA) transmitter and receiver.

FIG. 3 is a block diagram of an exemplary Orthogonal Frequency Division Multiple Access (OFDMA) transmitter and receiver and an exemplary Single Carrier-Frequency Division Multiple Access (SC-FDMA) transmitter and receiver. In an uplink, a transmitter may be part of a User Equipment (UE) and a receiver may be part of a Base Station (BS). In a downlink, the transmitter may be part of the BS and the receiver may be part of the UE.

Referring to FIG. 3, the OFDMA transmitter includes a Serial-to-Parallel (S-to-P) converter 202, a subcarrier mapper 206, an M-point Inverse Discrete Fourier Transform (IDFT) processor 208, a Cyclic Prefix (CP) adder 210, a Parallel-to-Serial (P-to-S) converter 212, and a Digital-to-Analog Converter/Radio Frequency (DAC/RF) module 214.

The OFDMA transmitter processes a signal in the following manner. First, a bit stream is modulated to a data symbol sequence. The bit stream may be obtained by subjecting a data block received from a Medium Access Control (MAC) layer to various processes including channel encoding, interleaving, scrambling, etc. The bit stream, which is equivalent to the data block from the MAC layer, may also be referred to as a codeword. The data block from the MAC layer is also known as a transport block. The modulation may be performed in a modulation scheme such as, but not limited to, Binary Phase Shift Keying (BPSK), Quadrature Phase Shift Keying (QPSK), or n-ary Quadrature Amplitude Modulation (n-QAM). Then the S-to-P converter 202 converts the serial data symbol sequence to N parallel data symbol sequences. The subcarrier mapper 206 maps N data symbols to N subcarriers allocated from among a total of M subcarriers and pads the remaining (M-N) subcarriers with 0s. The M-point IDFT processor 208 converts the data symbols mapped to a frequency area to a time-domain sequence by M-point IDFT. The CP adder 210 generates an OFDMA symbol by adding a CP to the time-domain sequence to reduce Inter-Symbol Interference (ISI) and Inter-Carrier Interference (ICI). The P-to-S converter 212 serializes the OFDMA symbol. The DAC/RF module 214 converts the serial OFDMA symbol to an analog signal, upconverts the frequency of the analog signal, and transmits the upconverted signal to the OFDMA receiver. Among the remaining (M-N) subcarriers, available subcarriers are allocated to another user.

The OFDMA receiver includes a Radio Frequency/Analog-to-Digital Converter (RF/ADC) module 216, an S-to-P converter 218, a CP remover 220, an M-point Discrete Fourier Transform (DFT) processor 222, a subcarrier demapper/equalizer 224, a P-to-S converter 228, and a detector 230. The OFDMA receiver processes a received signal in the reverse order of the operation of the OFDMA transmitter.

Meanwhile, the SC-FDMA transmitter includes an N-point DFT processor 204 at a front end of the subcarrier mapper 206 in addition to the components of the OFDMA transmitter. The SC-FDMA transmitter may reduce the Peak-to-Average Power Ratio (PAPR) of a transmission signal considerably by spreading a plurality of data symbols across a frequency area before IDFT, compared to OFDMA.

The SC-FDMA receiver includes an N-point IDFT processor 226 at a rear end of the subcarrier demapper/equalizer 224 in addition to the components of the OFDMA receiver. The SC-FDMA receiver processes a received signal in the reverse order of the operation of the SC-FDMA transmitter.

The components illustrated in FIG. 3 are a mere exemplary application. The transmitters and/or receivers may further include a required component, some of their components/functions may be omitted, a single component may be separated into different components, and two or more components may be incorporated into a single component.

Figure 4:
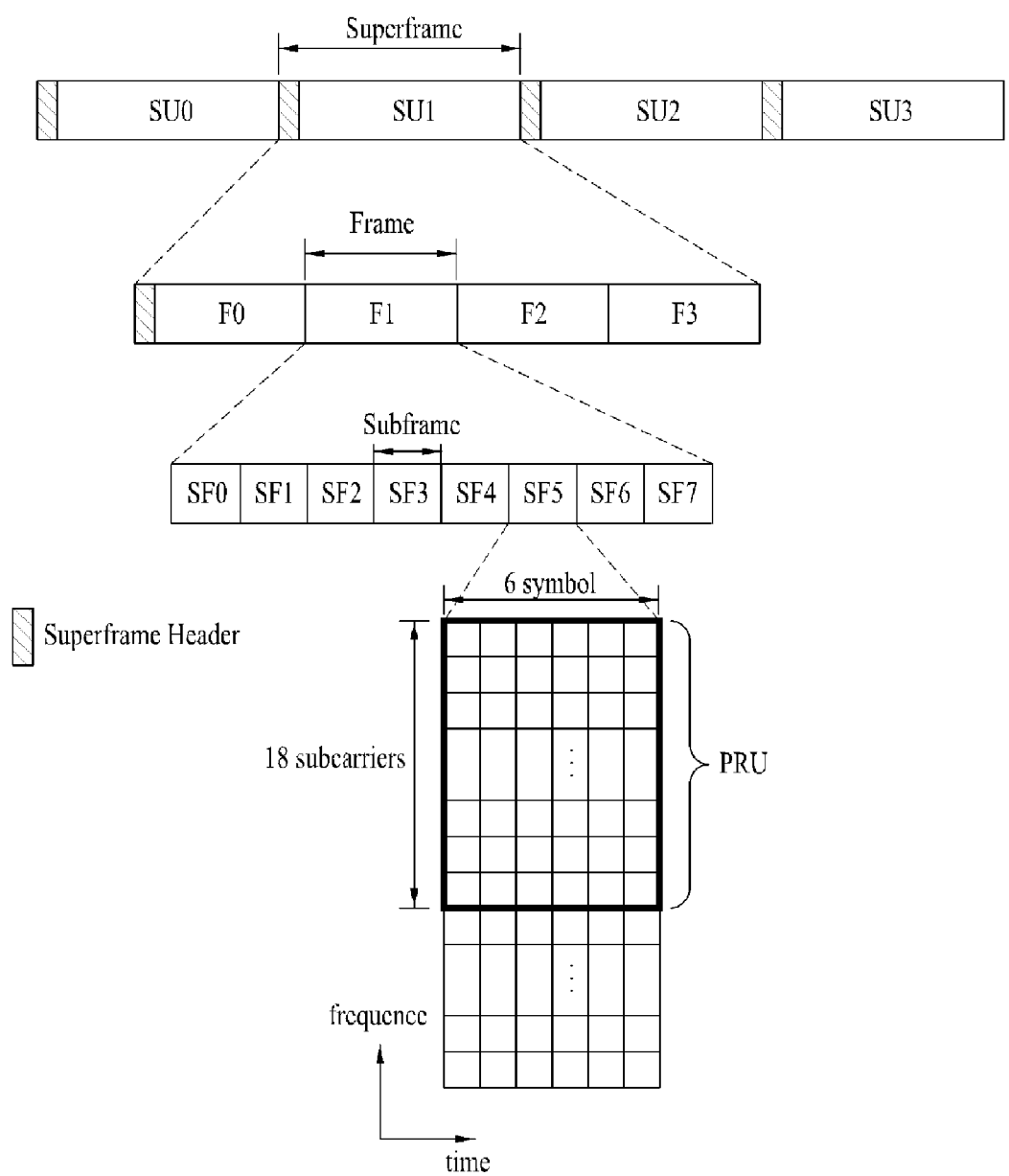
FIG. 4 illustrates an exemplary radio frame structure in an Institute of Electrical and Electronics Engineers (IEEE) 802.16m system.

FIG. 4 illustrates an exemplary radio frame structure in an IEEE 802.16m system. The frame structure may be applied to Frequency Division Duplex (FDD), Half-FDD (H-FDD), Time Division Duplex (TDD), etc.

Referring to FIG. 4, 20-ms superframes SU0 to SU3 supporting 5-MHz, 8.75-MHz, and 10-MHz bandwidths are defined in the radio frame structure. Each superframe includes four frames F0 to F3 of the same size 5 ms and starts with a SuperFrame Header (SFH). The SFH delivers essential system parameters and system configuration information. The SFH may reside in the first subframe. SFHs may be classified into a Primary SFH (P-SFH) and a Secondary SFH (S-SFH). The P-SFH is transmitted in every superframe, and the SFH may be transmitted in every superframe. The SFH may include a broadcast channel.

A frame includes eight subframes SF0 to SF7 which are allocated for downlink and uplink transmissions. Each subframe includes a plurality of Orthogonal Frequency Division Multiplexing (OFDM) symbols in time and a plurality of subcarriers in frequency. The OFDM symbols may be called OFDMA symbols, SC-FDMA symbols, or the like depending on a used multiple access scheme. The number of OFDM symbols included in a subframe may vary according to a channel bandwidth and a CP length. Subframe types may be defined according to the number of OFDM symbols included in a subframe. For instance, it may be defined that a type-1 subframe includes six OFDM symbols, a type-2 subframe includes seven OFDM symbols, a type-3 subframe includes five OFDM symbols, and a type-4 subframe includes nine OFDM symbols. One subframe may include subframes of the same type or different types.

An OFDM symbol includes a plurality of subcarriers and the number of subcarriers is determined by a Fast Fourier Transform (FFT) size. Subcarriers may be categorized into data subcarriers used for data transmission, pilot subcarriers used for channel measurement, a guard band, and null subcarriers for Direct Current (DC) components. The OFDM symbol is characterized by the parameters of BW, $N_{used}$, n G, etc. BW represents a nominal channel bandwidth, $N_{used}$ represents the number of subcarriers used for signal transmission, n is a sampling factor that determines a subcarrier spacing and a useful symbol time along with BW and $N_{used}$, and G represents a ratio of a CP time to the useful symbol time.

Table 1 below lists an example of OFDMA parameters.

TABLE 1

| The nominal channel bandwidth, BW (MHz) | | | 5 | 7 | 8.75 | 10 | 20 |
|---|---|---|---|---|---|---|---|
| Sampling factor, n | | | 28/25 | 8/7 | 8/7 | 28/25 | 28/25 |
| Sampling frequency, $F_s$ (MHz) | | | 5.6 | 8 | 10 | 11.2 | 22.4 |
| FFT size, $N_{FFT}$ | | | 512 | 1024 | 1024 | 1024 | 2048 |
| Subcarrier spacing, Δf (kHz) | | | 10.94 | 7.81 | 9.77 | 10.94 | 10.94 |
| Useful symbol time, $T_b$ (μs) | | | 91.4 | 128 | 102.4 | 91.4 | 91.4 |
| CP ratio, G = 1/8 | OFDMA symbol time, $T_s$ (μs) | | 102.857 | 144 | 115.2 | 102.857 | 102.857 |
| | FDD | Number of OFDMA symbols per 5 ms frame | 48 | 34 | 43 | 48 | 48 |
| | | Idle time (μs) | 62.857 | 104 | 46.40 | 62.857 | 62.857 |
| | TDD | Number of OFDMA symbols per 5 ms frame | 47 | 33 | 42 | 47 | 47 |
| | | TTG + RTG (μs) | 165.714 | 248 | 161.6 | 165.714 | 165.714 |
| CP ratio, G = 1/16 | OFDMA symbol time, $T_s$ (μs) | | 97.143 | 136 | 108.8 | 97.143 | 97.143 |
| | FDD | Number of OFDMA symbols per 5 ms frame | 51 | 36 | 45 | 51 | 51 |
| | | Idle time (μs) | 45.71 | 104 | 104 | 45.71 | 45.71 |
| | TDD | Number of OFDMA symbols per 5 ms frame | 50 | 35 | 44 | 50 | 50 |
| | | TTG + RTG (μs) | 142.853 | 240 | 212.8 | 142.853 | 142.853 |

TABLE 1-continued

| The nominal channel bandwidth, BW (MHz) | | | 5 | 7 | 8.75 | 10 | 20 |
|---|---|---|---|---|---|---|---|
| CP ratio, G = 1/4 | | OFDMA symbol time, $T_s$ (μs) | 114.286 | 160 | 128 | 114.286 | 114.286 |
| | FDD | Number of OFDMA symbols per 5 ms frame | 43 | 31 | 39 | 43 | 43 |
| | | Idle time (μs) | 85.694 | 40 | 8 | 85.694 | 85.694 |
| | TDD | Number of OFDMA symbols per 5 ms frame | 42 | 30 | 38 | 42 | 42 |
| | | TTG + RTG (μs) | 199.98 | 200 | 136 | 199.98 | 199.98 |
| Number of Guard Sub-Carriers | | Left | 40 | 80 | 80 | 80 | 160 |
| | | Right | 39 | 79 | 79 | 79 | 159 |
| Number of Used Sub-Carriers | | | 433 | 865 | 865 | 865 | 1729 |
| Number of Physical Resource Unit (18 × 6) in a type-1 sub-frame. | | | 24 | 48 | 48 | 48 | 96 |

A subframe includes a plurality of Physical Resource Units (PRUs) in the frequency domain. A PRU is a basic unit for resource allocation, including a plurality of contiguous OFDM symbols in the time domain by a plurality of contiguous subcarriers in the frequency domain. For example, the number of OFDM symbols in a PRU may be equal to that of OFDM symbols in a subframe. Therefore, the number of OFDM symbols in a PRU may be determined by the type of a subframe. In the mean time, the PRU may have 18 subcarriers. Then the PRU may be comprised of 6 OFDM symbols by 18 subcarriers. There are two types of PRUs according to the type of resource allocation, Distributed Resource Unit (DRU) for distributed resource allocation and Contiguous Resource Unit (CRU) for localized resource allocation.

The foregoing structure is an exemplary application. Hence, a superframe length, the number of frames included in a superframe, the number of subframes included in a frame, the number of OFDMA symbols included in a subframe, parameters for an OFDMA symbol, etc. may vary. For example, the number of subframes in a frame may be changed according to a channel bandwidth, a CP length, etc.

Figure 5:
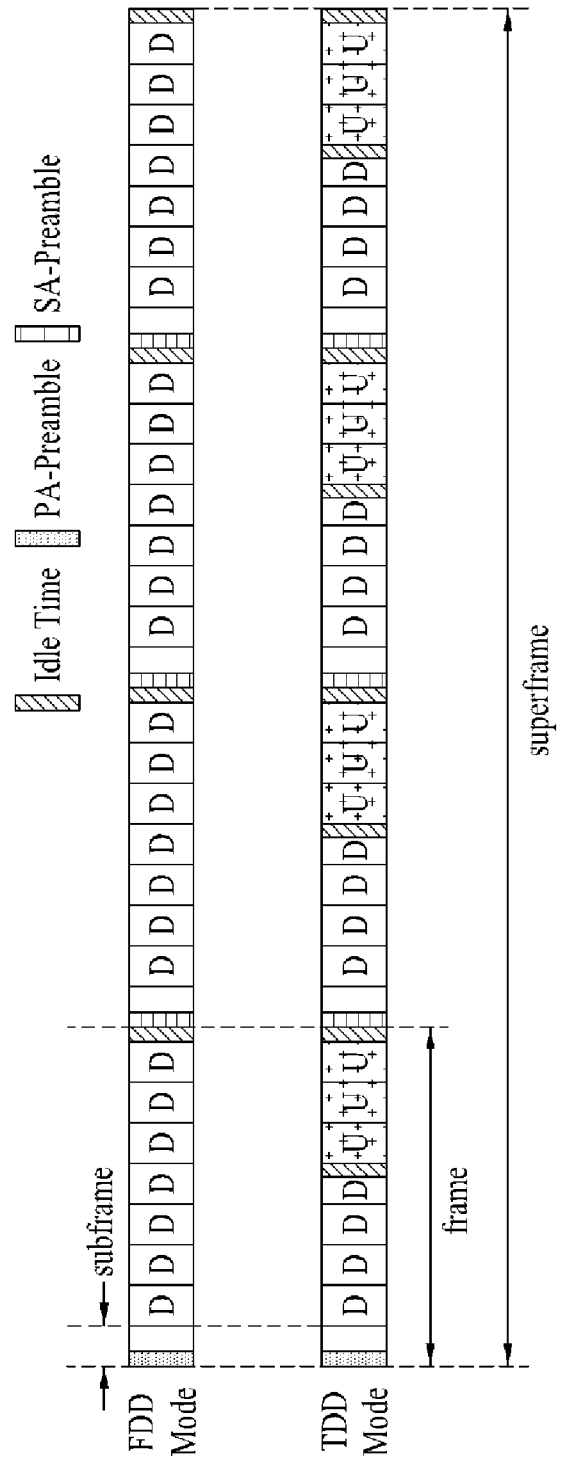
FIG. 5 illustrates superframe structures for duplex modes in the IEEE 802.16m system.

FIG. 5 illustrates superframe structures for duplex modes in the IEEE 802.16m system. In an embodiment of the present invention, an IEEE 802.116m only mode is assumed.

Referring to FIG. 5, since downlink transmission is distinguished from uplink transmission by frequency in FDD mode, a frame includes only downlink subframes D or uplink subframes U. In the FDD mode, an idle time may be defined at the end of every frame. In contrast, downlink transmission is distinguished from uplink transmission by time in TDD mode. Thus, the subframes of a frame are divided into downlink subframes D and uplink subframes U. For switching from the downlink to the uplink, a transition gap called Transmit/receive Transition Gap (TTG) is defined between a downlink subframe and its subsequent uplink subframe. For switching from the uplink to the downlink, a transition gap called Receive/transmit Transition Gap (RTG) is defined between an uplink subframe and its subsequent downlink subframe. In the IEEE 802.16m system, there are two types of downlink Synchronization Channels (SCHs), Primary SCH (P-SCH) And Secondary SCH (S-SCH). The P-SCH carriers a Primary Advanced (PA)-preamble and the S-SCH carriers a Secondary Advanced (SA)-preamble. The PA-preamble is used for time/frequency synchronization and acquisition of information such as a partial cell ID, system information, etc. The SA-preamble is used to acquire a final physical cell ID. Also, the SA-preamble may serve the purpose of measuring a Received Signal Strength Indication (RSSI) or the like.

A Transmission Time Interval (TTI) is defined as a period over which a packet encoded in a physical layer is transmitted via a radio interface. When Hybrid Automatic Repeat reQuest (HARQ) is supported, an encoded packet is transmitted in the form of an HARQ subpacket. The TTI is one or more subframes. Typically, a basic TTI is set as one subframe. Accordingly, a data packet is transmitted in one subframe or in a plurality of contiguous subframes. Herein, a short TTI is defined as one subframe and a long TTI is defined as two or more subframes. For instance, a long TTI may be set as four subframes for each of the downlink and uplink in FDD, while a long TTI may be set as one entire downlink subframe and one entire uplink subframe in a frame in TDD.

Figure 6:
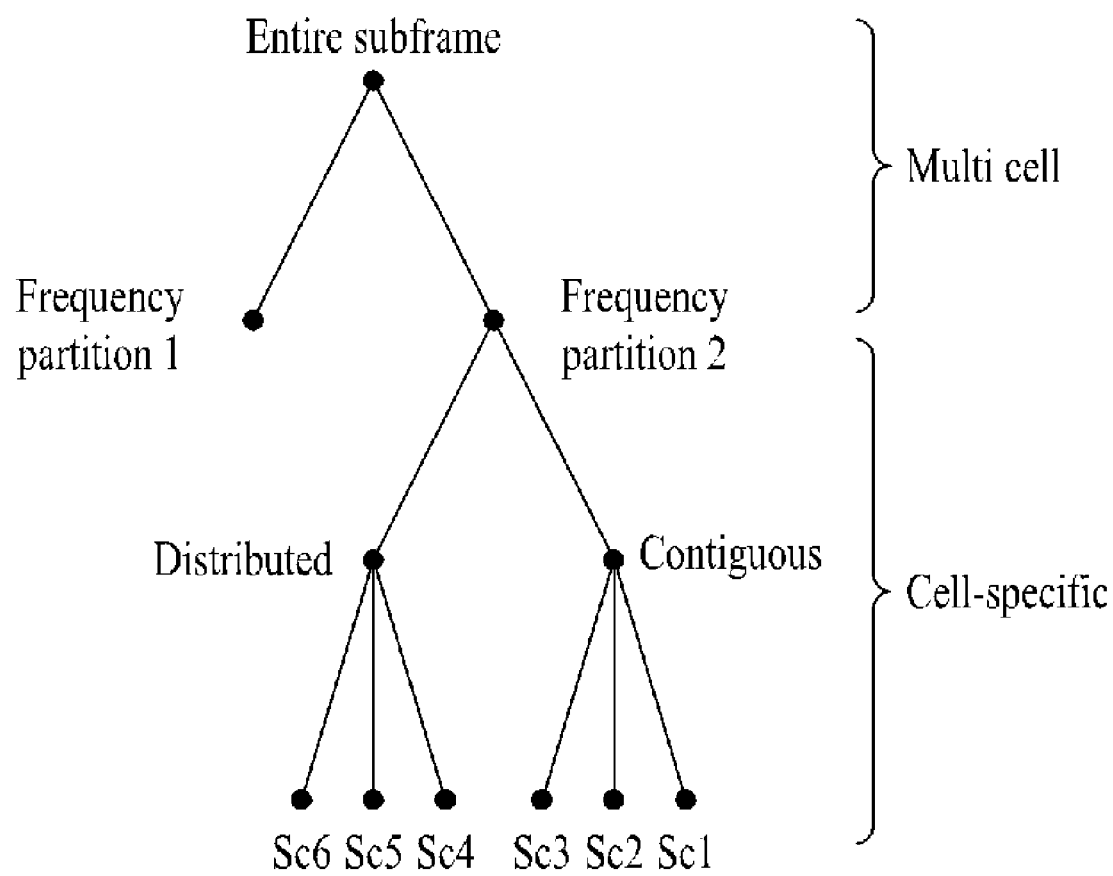
FIG. 6 illustrates an exemplary physical structure of a subframe in the IEEE 802.16m system.

FIG. 6 illustrates an exemplary physical structure of a subframe in the IEEE 802.16m system.

Referring to FIG. 6, a subframe may be divided into at least one Frequency Partition (FP). A subframe is divided into two FPs in the illustrated case of FIG. 6, to which the number of FPs is not limited. The FP may be used for Fractional Frequency Reuse (FFR).

Each FP includes at least one PRU. Distributed resource allocation and/or contiguous resource allocation may be applied to the FP. A Logical Resource Unit (LRU) is a basic logical unit for distributed and contiguous (localized) resource allocations. A Logical Distributed Resource Unit (LDRU) includes a plurality of subcarriers Sc distributed across a frequency band. The size of an LDRU is equal to that of a PRU. The LDRU is also called a Distributed LRU (DLRU). A Logical Contiguous Resource Unit (LCRU) includes contiguous subcarriers Sc. The size of a LCRU is also equal to that of a PRU. The LCRU is also called a Contiguous LRU (CLRU).

Figure 7:
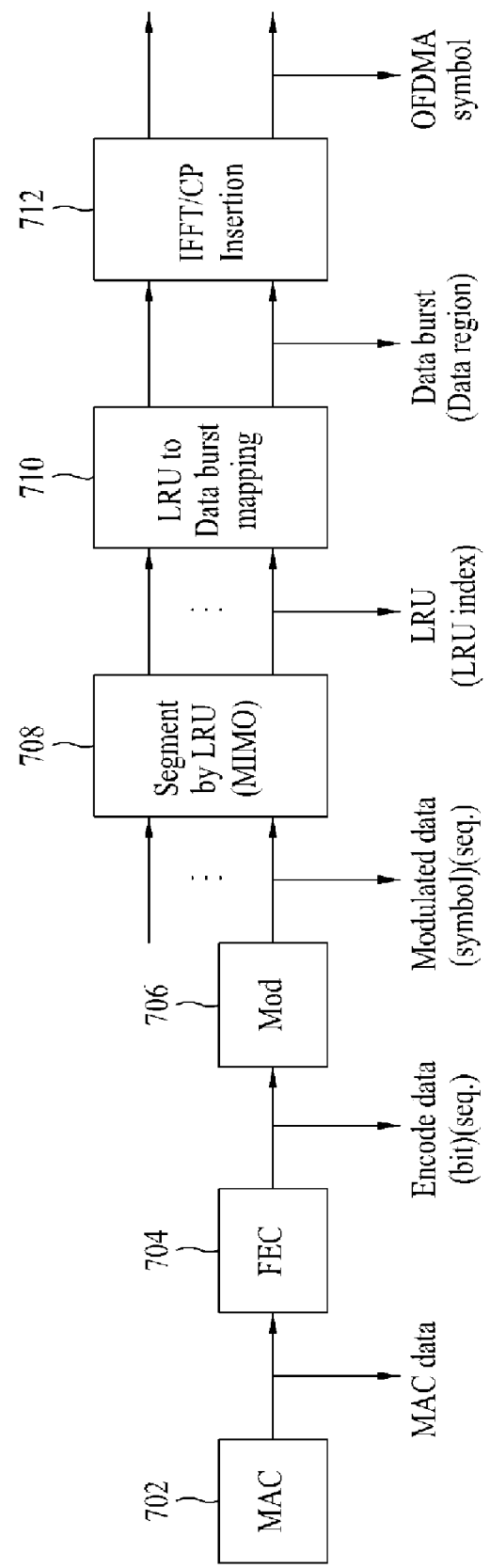
FIG. 7 is a block diagram of an exemplary transmission chain in the IEEE 802.16m system.

FIG. 7 is a block diagram of an exemplary transmission chain in the IEEE 802.16m system.

Referring to FIG. 7, a MAC block 702 configures MAC data with data received from an upper layer. The MAC data is scheduled on a TTI basis. The MAC data is also called a transport block which corresponds to a codeword in a subsequent process. A Forward Error Correction (FEC) block 704 channel-encoded the MAC data according to a channel coding scheme. The channel coding scheme may be Turbo Coding (TC), Convolutional Turbo Coding (CTC), Low Density Parity Check (LDPC) coding, etc., which should not be construed as limiting the scope of the present invention. The encoded data may be referred to as a codeword or encoded packet data. A Modulation (Mod) block 706 modulates the encoded data according to a modulation scheme such as n-ary Phase Shift Keying (n-PSK), n-QAM, or the like (n is an integer), to which the present invention is not limited. An LRU allocation block 708 divides the modulation symbols into segments, each of which has an LRU size, and allocates the segments to LRUs. A mapping block 710 maps the LRUs to data bursts. The data bursts are allocated to PRUs in the physical frequency domain. Hence, the mapping block 710 functions to map the modulated data to subcarriers according to a mapping relationship between LRUs and PRUs. An Inverse Fast Fourier Transform/Cyclic Prefix (IFFT/CP) block 710 converts the frequency-domain signal to a time-domain signal by IFFT and generates an OFDMA symbol by adding a CP to the time-domain signal.

Figure 8:
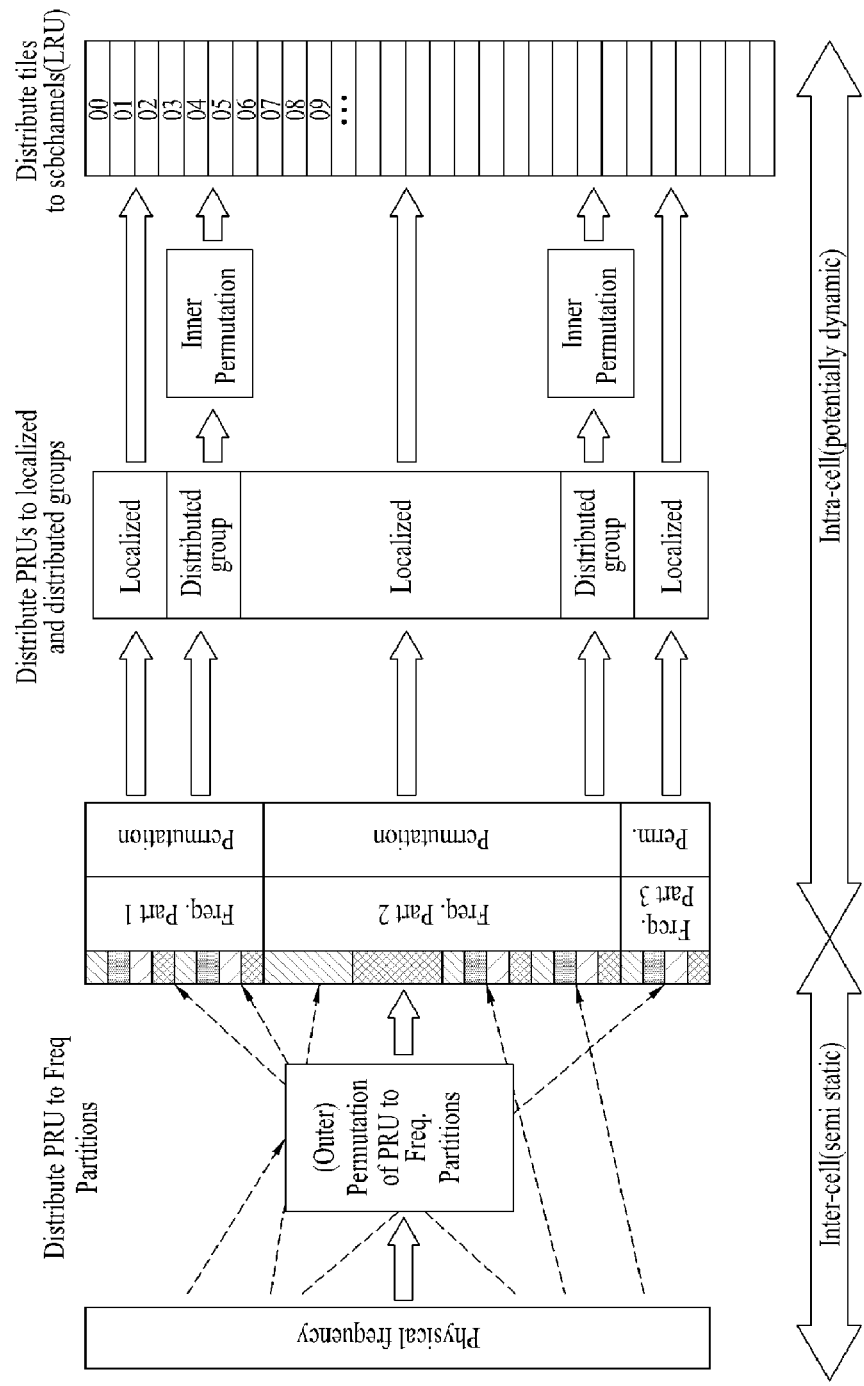
FIG. 8 illustrates an exemplary operation for mapping resource units.

FIG. 8 illustrates an exemplary operation for mapping resource units.

Referring to FIG. 8, outer permutation may be performed for physical frequency resources. The outer permutation applies in units of at least one PRU. The outer permutation may be implemented in units of N1 or N2 PRUs (N1>N2) and N1 and N2 may vary depending on a bandwidth. One thing to note herein is that N1 needs to be an integer multiple of N2, for efficient outer permutation. The outer permutation may be the process of dividing PRUs into SubBand (SB) PRUs, $PRU_{SB}$ and MiniBand (MB) PRUs, $PRU_{MB}$, like subband segmentation and miniband permutation, and permuting the MB PRUs on a PRU basis. The SB PRUs, $PRU_{SB}$ are to be allocated to a subband, whereas MB PRUs, $PRU_{MB}$ are to be allocated to minibands. N1 is the number of PRUs included in a subband and N2 is the number of PRUs in a miniband.

The reordered PRUs are distributed to FPs. Each FP is divided into LCRUs and LDRUs. Sector-specific permutation may be supported and direct resource mapping may be supported for contiguous (i.e. localized) resources. The size of distributed/localized resources may be flexibly set in each sector.

Then, the distributed groups and localized groups are mapped to LRUs. Inner permutation defined for distributed resource allocation distributes subcarriers over total distributed resources. There is no inner permutation for contiguous resource allocation. PRUs are directly mapped to CRUs in each FP.

Meanwhile, an FFR scheme may be used. According to the FFR scheme, a total frequency band is divided into a plurality of FPs and an FP is allocated to each cell. Different FPs may be allocated to adjacent cells and the same FP to cells remote from each other by the FFR scheme. As a consequence, inter-cell interference may be reduced and the performance of UEs at a cell edge may be increased.

Figure 9:
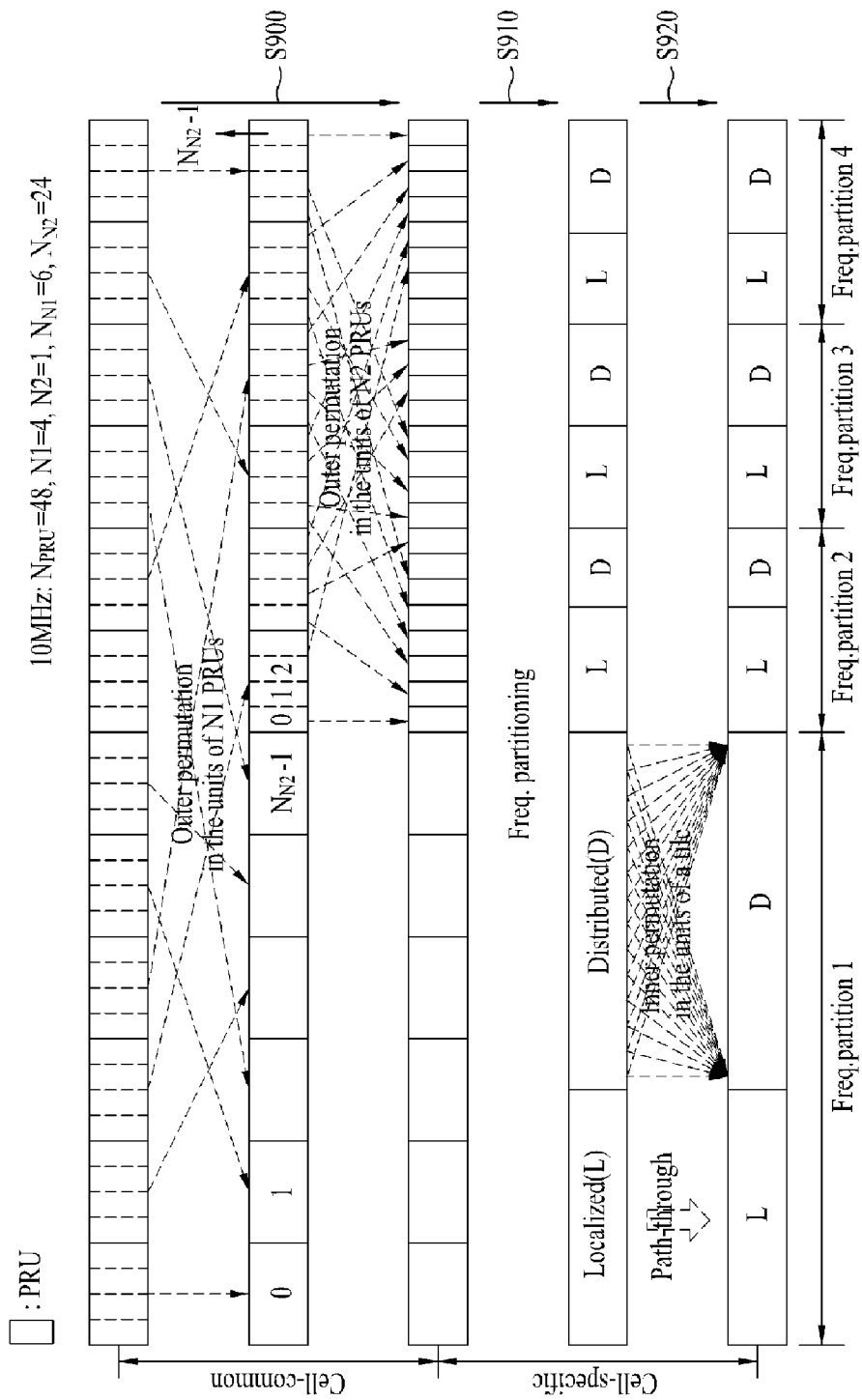
FIG. 9 illustrates an exemplary subchannelization operation.

FIG. 9 illustrates an exemplary subchannelization operation. For subchannelization, there are certain factors to be considered, for example, inclusive of DRU and CRU performance, signaling overhead for resource allocation, the overhead of Channel Quality Indicator (CQI) feedback, the flexibility of a ratio between distributed resources and localized resources, the readiness of scaling based on a bandwidth (BW), the easiness of designing a resource allocation sequence, the easiness of FFR setting, etc. For notational simplicity, it is assumed that a total frequency band is 10 MHz, there are 48 PRUs in total, N1 is 4, the number of subbands with a granularity of N1, $N_{N1}$ is 6, N2 is 1, and the number of minibands with a granularity of N2, $N_{N2}$ is 24.

Referring to FIG. 9, physical areas, PRUs are divided into logical areas, SB PRUs or MB PRUs by outer permutation with a granularity of N2, and the MB PRUs are permuted with a granularity of N2 in step S900.

In step S910, the SB PRUs or the MB PRUs are distributed to FPs and localized resources L are distinguished from distributed resources D in each FP by permutation. The step of distributing the SB PRUs or the MB PRUs to FPs may be incorporated into or implemented independently of the outer permutation in step S900. In the case of the independent operation of PRU distribution to FPs, it may be performed based on FP information broadcast in an SFH, or according to a separately established distribution rule. To achieve a diversity gain from the distributed resources, inner permutation is additionally performed for the distributed resources in step S920.

FIGS. 10A, 10B and 10C illustrate an exemplary permutation based on block interleaving. The block interleaving may involve row-wise index writing, intra-row permutation, intra-column permutation, and column-wise index reading. The order of performing the steps is shown by way of example, and thus it may be changed freely.

With reference to FIGS. 10A, 10B and 10C, block interleaving of resource indexes 0 to 40 will be described, by way of example. Each resource index indicates a basic resource to be interleaved and basic resources may be neighboring to each other in the frequency domain.

FIG. 10A illustrates a result of writing the resource indexes 0 to 40 in an interleaving matrix in a row-wise direction, to which the present invention is not limited. The row-wise writing may be followed by intra-row permutation of the interleaving matrix. The intra-row permutation may be performed according to a permutation pattern shared between a transmitter and a receiver. FIG. 10B(a) illustrates an example of intra-row permutation pattern taking the form of a matrix. In another example, the intra-row permutation may be performed using a base permutation sequence of length 5. In an embodiment of the present invention, the base permutation sequence is, for example, [0, 3, 1, 4, 2].

FIG. 10B(b) illustrates the result of the intra-row permutation. It is noted from FIG. 10B(b) that the resource indexes are mixed in each row by the intra-row permutation.

After the intra-row permutation, intra-column permutation may be applied to the interleaving matrix. The intra-column permutation may be performed according to a permutation pattern shared between the transmitter and the receiver. FIG. 10C(a) illustrates an example of intra-column permutation pattern taking the form of a matrix. In another example, the intra-row permutation may be performed using a base permutation sequence of length 8. In an embodiment of the present invention, the base permutation sequence is, for example, [0, 5, 2, 7, 4, 1, 6, 3].

FIG. 10C(b) illustrates the result of the intra-column permutation. It is noted from FIG. 10C(b) that the resource indexes are mixed in each column by the intra-column permutation. After the intra-column permutation, the resource indexes written in the interleaving matrix are read column by column, i.e. in a column-wise direction. As a consequence, the sequence of the original resource indexes [0, 1, 2, 3, 4, 5, ..., 40] is permuted to [0, 25, 11, 36, 22, 8, ..., 38].

The resources of a distributed resource area may be effectively mixed and distributed through the block interleaving.

Accordingly, signal transmission in predetermined resources that are block-interleaved may lead to a sufficient frequency diversity gain. However, conventionally, no consideration is given to time in a permutation pattern for block interleaving and thus a block interleaving output pattern is always the same. Therefore, the conventional block interleaving effectively distributes frequency resources in a given area, but relatively identical frequencie resources are adjacent to each other in the time domain all the time. A regular arrangement of resources in the time domain reduces interference randomization, thus degrading system performance.

Embodiment: Resource Permutation based on Time Parameter

Figure 11:
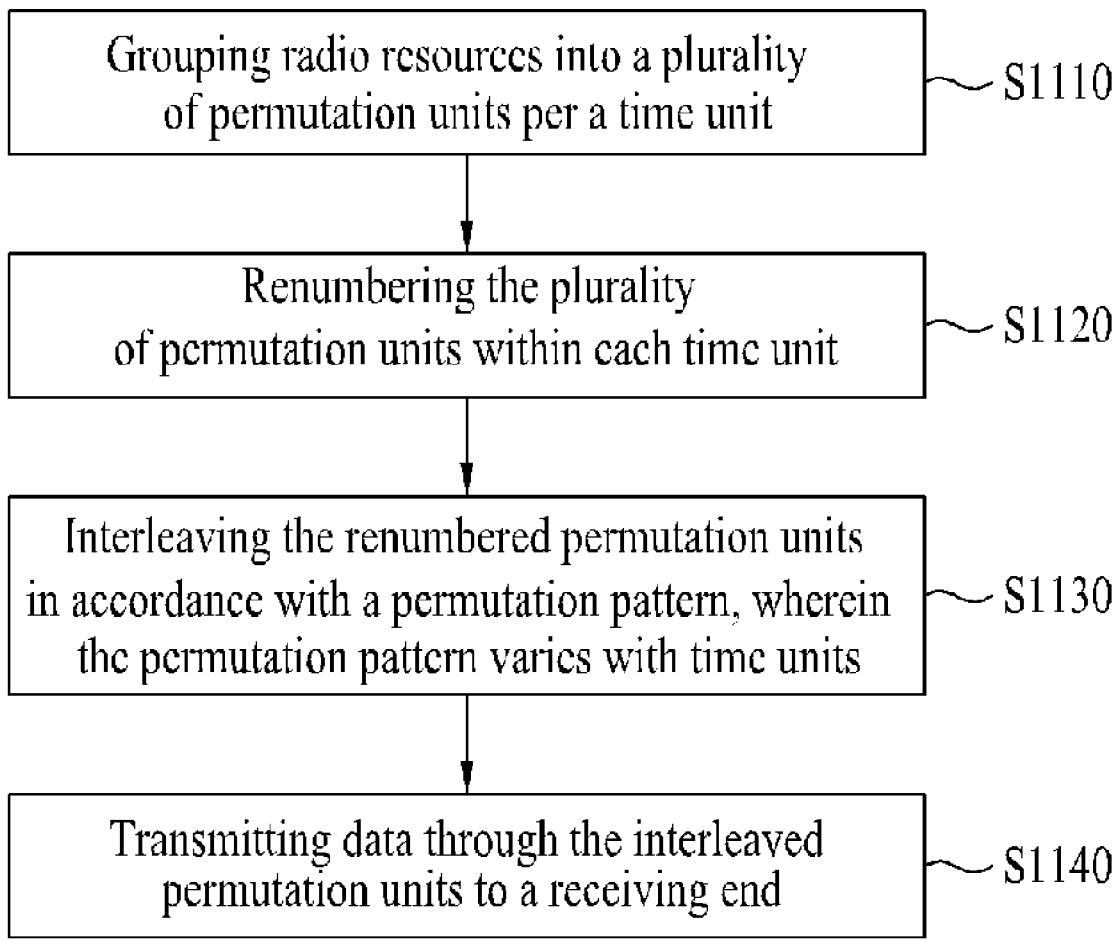
FIG. 11 is a flowchart illustrating an operation for performing permutation, taking time into account and transmitting data in distributed resources according to an embodiment of the present invention.

FIG. 11 is a flowchart illustrating an operation for performing permutation, taking time into account and transmitting data in distributed resources according to an embodiment of the present invention.

Referring to FIG. 11, radio resources may be grouped into a plurality of permutation units on a time unit basis in step S1110. The radio resources may include at least part of a system band. The permutation unit is a basic interleaving unit which may include one or more subcarriers. The time unit for permutation may include one subframe or a multiple of subframe. The plurality of permutation units may be renumbered within each time unit in step S1120. The renumbered permutation units are interleaved according to a permutation pattern. In this case, the block interleaving scheme illustrated in FIGS. 10A, 10B and 10C is available. Instead, a permutation sequence for interleaving may be used. Notably, the permutation pattern for interleaving varies with time units in step S1130. For example, the time parameter-based permutation may be carried out by use of at least one of time-variant intra-row permutation and time-variant intra-column permutation. Therefore, when data is transmitted using a plurality of frequency resources by a plurality of time resources, the transmitter may be able to mix and distribute resources for data transmission in the frequency domain in a time-variant form. Then the transmitter may transmit data through the interleaved resources to the receiver in step S1140.

Figure 12:
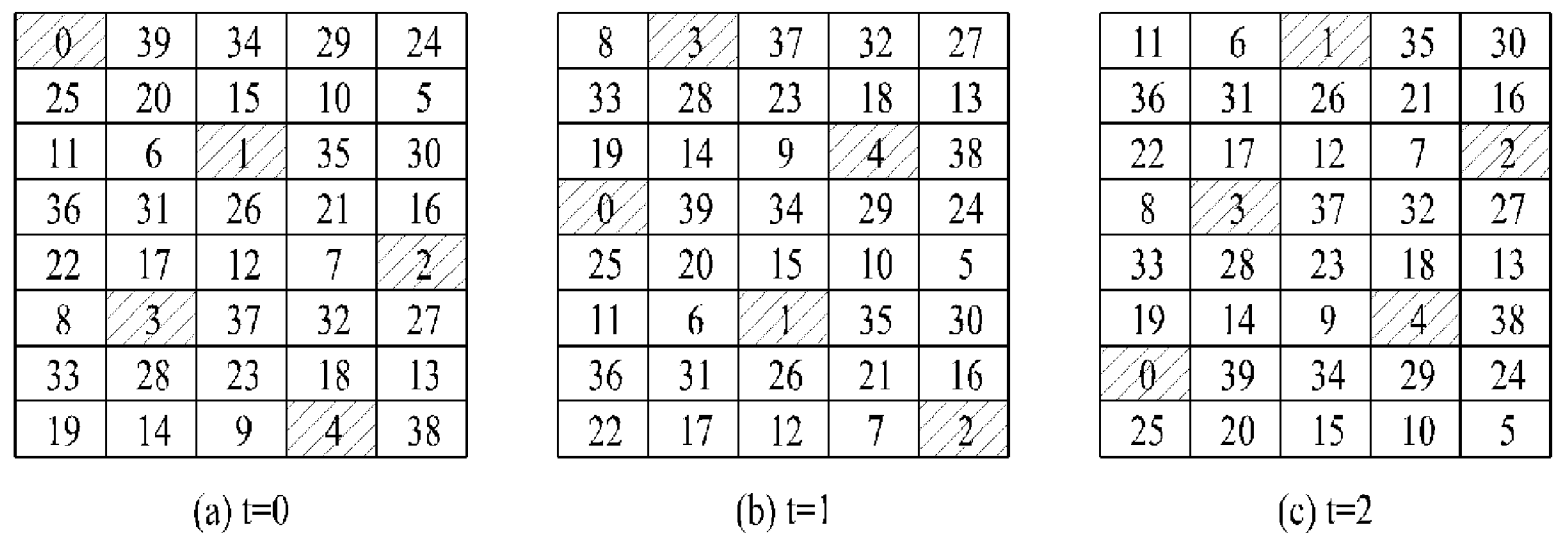

FIG. 12 illustrates an exemplary permutation that is performed taking time into account according to the embodiment of the present invention.

Referring to FIG. 12, it is noted that a block interleaving pattern varies with time t. In an embodiment of the present invention, resource indexes are shifted downward by three rows during intra-column permutation as time t passes (refer to resource indexes marked with slashed lines). In another example, time t may affect intra-row permutation or both the intra-row permutation and the intra-column permutation. Also, time t may affect a permutation pattern in various ways such as shifting, masking, etc.

Now a detailed description will be made of applications of an embodiment of the present invention by inner permutation applied to uplink DRUs.

Figure 13:
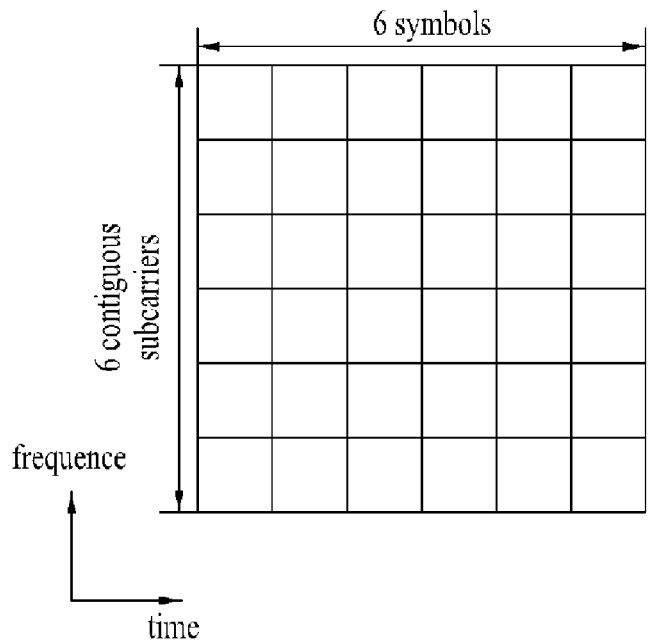
FIG. 13 illustrates an exemplary structure of an uplink tile.

FIG. 13 illustrates an exemplary structure of an uplink tile.

Referring to FIG. 13, an uplink tile includes 6 contiguous subcarriers by 6 contiguous OFDMA symbols. Hence, three tiles form one resource unit. Since the number of OFDMA symbols per tile is equal to that of OFDMA symbols per subframe, the number of OFDMA symbols per tile may vary with the type of a subframe. A tile is a basic unit for permutation, which includes both pilot subcarriers and data subcarrier. While downlink inner permutation is performed such that only data subcarriers are interleaved, it is to be noted that uplink inner permutation is performed on the basis of a tile including pilot subcarriers.

Figure 14:
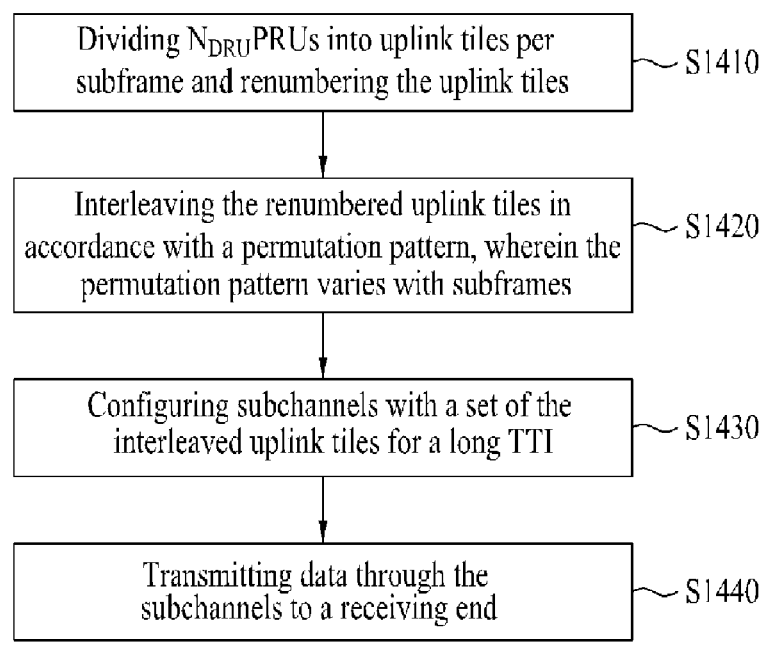
FIG. 14 is a flowchart illustrating an operation for performing inner permutation, taking time into account, and transmitting data in distributed resources according to an embodiment of the present invention.

FIG. 14 is a flowchart illustrating an operation for performing inner permutation, taking time into account and transmitting data through distributed resources according to an embodiment of the present invention.

Referring to FIG. 14, distributed resources may be divided into uplink tiles on a subframe basis and the entire tiles may be renumbered with new indexes in step S1410. The distributed resources may include one or more PRUs (i.e. DRUs). The renumbered tiles are interleaved in a permutation pattern. In this case, the block interleaving scheme illustrated in FIGS. 10A, 10B and 10C is available. Instead, a permutation sequence for interleaving may be used. Notably, the permutation pattern varies with subframes in step S1420. For example, a time parameter-based permutation may be carried out by use of at least one of time-variant intra-row permutation and time-variant intra-column permutation. Therefore, when data is transmitted using one or more PRUs in a plurality of successive subframes, the transmitter may be able to mix and distribute tiles for data transmission in the frequency domain, in a time-variant form. transmitter may configure uplink subchannels using the interleaved tiles in step S1420. The uplink subchannels correspond to LRUs successive in time across a plurality of subframes. Then the transmitter may transmit data through the subchannels to the receiver in step S1440.

EXAMPLE 1

Permutation of Uplink Tiles in Case of Long TTI

Figure 15:
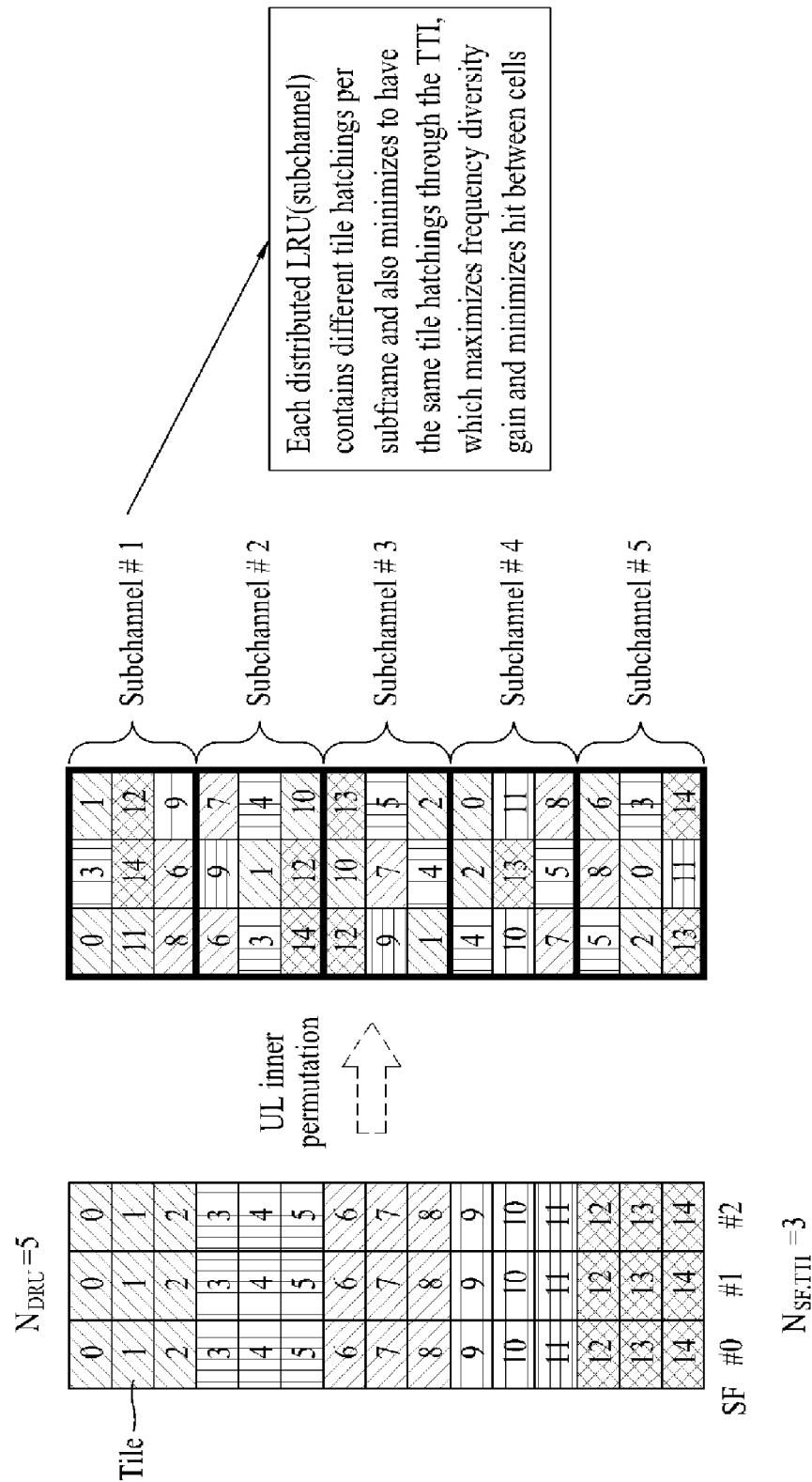
FIG. 15 illustrates an exemplary inner permutation according to the embodiment of the present invention.

FIG. 15 illustrates an exemplary inner permutation when $N_{DRU}=5$ according to the embodiment of the present invention. It is assumed that the number of subframes (SFs) included in a TTI is 3 ($N_{SF,TTI}=3$).

Referring to FIG. 15, distributed resources may include a plurality of DRUs per subframe, each DRU having a plurality of tiles. In the embodiment of the present invention, each DRU includes three tiles, by way of example. Accordingly, the distributed resources include 15 tiles per subframe. Inner permutation is performed for one or more DRUs, on a tile basis. For this purpose, all tiles within the distributed resources may be renumbered. In the embodiment of the present invention, the tiles are numbered 0 to 14 sequentially.

The inner permutation may be performed by the interleaving scheme illustrated in FIGS. 10A, 10B and 10C. The interleaving matrix may be of $N_{tile,PRU} \times N_{DRU}$. $N_{tile,PRU}$ represents the number of tiles in a resource unit and $N_{DRU}$ represents the number of DRUs. In the interleaving matrix, the row indexes m range from 0 to $N_{tile,PRU}-1$ and the column indexes n range from 0 to $N_{DRU}-1$. Also, the inner permutation may be performed using a permutation sequence. The permutation sequence may be created by use of intra-row permutation and/or intra-column permutation.

In the embodiment of the present invention, a permutation pattern used for each permutation may be modified from a base permutation pattern in consideration of a subframe index in a predetermined method. For the convenience' sake, the basic permutation pattern may be assumed to be a permutation pattern applied to a first uplink subframe (e.g., subframe index 0 in uplink). If a sequence [0, 1, 2, 3, 4, 5, 6, 7, 8, 9, 10, 11, 12, 13, 14] is permuted, a permutation pattern [0, 11, 8, 6, 3, 14, 12, 9, 1, 4, 10, 7, 5, 2, 13] is given for a first subframe, SF #0 and the permutation pattern is changed to [3, 14, 6, 9, 1, 12, 10, 7, 4, 2, 13, 5, 8, 0, 11] for a second subframe, SF #1.

After the permutation is completed, an uplink subchannel is configured with three tiles logically contiguous in frequency after permutation by a plurality of contiguous subframes. In the embodiment of the present invention, an uplink subchannel includes three logically contiguous tiles in frequency by three logically contiguous subframes in time. As noted from FIG. 15, tiles within a subchannel have different mapping patterns in the frequency domain in a time-variant form. Therefore, the permutation method according to the embodiment of the present invention maximizes a diversity gain by effectively distributing uplink resources, when data is transmitted through a plurality of subframes.

The above-described inner permutation is carried out by block interleaving including row-wise reading, time-variant intra-row permutation, intra-column permutation, and column-wise reading. Also, the inner permutation may be performed by block interleaving including at least one of time-variant intra-row permutation and time-variant intra-column permutation. Yet, this is a mere exemplary application and thus time-variant permutation is not limited to a specific example. Now, various modified examples of the time-variant inner permutation will be described below in detail.

EXAMPLE 2-1

Permutation of Distributed Resources using Sequence

Permutation may be performed for distributed resources without block interleaving in the following manner. For an $m^{th}$ tile in an $s^{th}$ LRU of a $t^{th}$ subframe, a permutation index R[n,m,t] (i.e. the index of a physical tile) may be defined as [Equation 1].

$$R[n,m,t]=s \times N_{DRU}+P[(n+s) \bmod N_{DRU}], \text{ where } s=(f_1 \times m+f_2 \times n+t) \bmod N_{tile,PRU} \quad \text{[Equation 1]}$$

In [Equation 1], $N_{DRU}$ denotes the number of DRUs and mod denotes a modulo operation. A mod B represents the remainder of A divided by B. P[•] denotes a base permutation sequence of length $N_{DRU}$ for intra-row permutation. Each element of P[•] may range from 0 to $N_{DRU}-1$. $N_{tile,PRU}$ denotes the number of tiles included in one resource unit.

In [Equation 1], $f_1$ is a positive integer that is prime for $N_{tile,PRU}$. Without intra-column permutation, $f_1$ may be set to 1. $f_2$ is also a positive integer. If $f_2$ is prime for $N_{DRU}$, each column has a different intra-column permutation pattern. To use the same intra-column permutation pattern for all columns, $f_2$ may be set to 0. If the time parameter t is not used, the permutation sequence is time-invariant. [Equation 1] may be expressed as [Equation 2].

$$R[n,m,t]=s \times N_{DRU}+P_s[n], \text{ where } s=(f_1 \times m+f_2 \times n+t) \bmod 3 \quad \text{[Equation 2]}$$

In [Equation 2], $P_s[•]$ is achieved by cyclically shifting (rotating) the base permutation sequence P[•] to the left s times.

Meanwhile, the base permutation sequence P[•] may be generated by a random sequence generation algorithm. The base permutation sequence P[•] of length L may satisfy, but not limited to, the following equation.

$$(P[i+1]-P[i]) \bmod L = D \text{ or } D+1 \quad \text{[Equation 3]}$$

The random sequence satisfying the above condition is called an Almost Equidistance Permutation Sequence (AEPS) and permutation sequences P[i] are distributed with an almost equal distance D. When an offset O is defined for a permutation sequence, the permutation sequence starts with the value of (0 mod L). Specifically, the base permutation sequence P[•] may be defined as $$P[i]=\{D \times i+O+\text{floor}(i/W)\} \bmod L, \text{ where } i=0, 1, \ldots, L-1 \quad \text{[Equation 4]}$$

where D is a positive integer smaller than L, O denotes an offset value for a permutation sequence, and W is a window size satisfying W=L/GCD(L,D) in which GCD(L,D) represents the greatest common divisor between L and D.

For example, an AEPS may be given as
for L=14, D=6 and O=0,
P={0,6,12,4,10,2,8,1,7,13,5,11,3,9}
for L=16, D=4 and O=3,
P={3,7,11,15,4,8,12,0,5,9,13,1,6,10,14,2}
for L=18, D=7 and O=6,
P={6,13,2,9,16,5,12,1,8,15,4,11,0,7,14,3,10,17}

A. Generation of Permutation Sequence using Time-Variant Intra-Row Permutation and Time-Variant Intra-Column Permutation A time-variant intra-row permutation may also be applied to the permutation pattern generated by [Equation 2]. Then the time parameter t may be used as a shift or masking value for the intra-row permutation.

Intra-Row Permutation Using Time Parameter as Shift Value $$R[n, m, t]=s \times N_{DRU}+P_{(s+t)}[n] \quad \text{[Equation 5]}$$

where $s=(f_1 \times m+f_2 \times n+t) \bmod 3$

Intra-Row Permutation Using Time Parameter as Masking Value $$R[n, m, t]=s \times N_{DRU}+(P_s[n]+t) \bmod N_{DRU} \quad \text{[Equation 6]}$$

where $s=(f_1 \times m+f_2 \times n+t) \bmod 3$ $P_s[•]$ results from cyclically shifting (rotating) the base permutation sequence P[•] to the left s times. Also, $P_{time}[t]$ may substitute for the time parameter t as a time shift value or a masking value in the above equations by use of a permutation sequence using the time parameter t as an input index, $P_{time}[\ ]$ B. Generation of Permutation Sequence Using Cell-Specific, Time-Variant Intra-Row Permutation and Cell-Specific, Time-Variant Intra-Column Permutation A time-variant intra-row permutation may also be applied to the permutation pattern generated by [Equation 2]. In this case, the time parameter t may be used together with a cell-specific coefficient Coeff(Cell_ID), as a shift value or a masking value for the intra-row permutation. Coeff(•) is a function having a cell Identity (Cell_ID) as an element.

Intra-Row Permutation Using Time Parameter as Shift Value $$R[n, m, t, \text{Cell\_ID}]=s \times N_{DRU}+P_{(s+\text{Coeff}(Cell\_ID) \times t)}[n] \quad \text{[Equation 7]}$$

where $s=(f_1 \times m+f_2 \times n+\text{Coeff}(Cell\_ID) \times t) \bmod 3$

Intra-Row Permutation Using Time Parameter as Masking Value $$R[n, m, t, \text{Cell\_ID}]=s \times N_{DRU}+(P_s[n]+\text{Coeff}(Cell\_ID) \times t) \bmod N_{DRU} \quad \text{[Equation 8]}$$

where $s=(f_1 \times m+f_2 \times n+\text{Coeff}(Cell\_ID) \times t) \bmod 3$

C. Generation of Permutation Sequence Using Time-Variant Intra-Row Permutation and Time-Invariant Intra-Column Permutation In case of time-invariant intra-column permutation, the time parameter t is not used for calcualtion of the s value. Rather, the time parameter t is used only for intrarow permutation.

Intra-Row Permutation Using Time Parameter as Shift Value $$R[n, m, t]=s \times N_{DRU}+P_{(s|t)}[n] \quad \text{[Equation 9]}$$

where $s=(f_1 \times m+f_2 \times n) \bmod 3$

Intra-Row Permutation Using Time Parameter as Masking Value $$R[n, m, t]=s \times N_{DRU}+(P_s[n]+t) \bmod N_{DRU} \quad \text{[Equation 10]}$$

where $s=(f_1 \times m+f_2 \times n) \bmod 3$

D. Generation of Permutation Sequence Using Cell-Specific, Time-Variant Intra-Row Permutation and Time-Invariant Intra-Column Permutation In case of time-invariant intra-column permutation, the time parameter t is not used for calcualtion of the s value. Rather, the time parameter t is used together with a cell-specific coefficient Coeff(Cell_ID), only for intra-row permutation.

Intra-Row Permutation Using Time Parameter as Shift Value $$R[n, m, t, \text{Cell\_ID}] = s \times N_{DRU} + P_{(s+\text{Coeff}(\text{Cell\_ID}) \times t)}[n] \quad \text{[Equation 11]}$$

where $s = (f_1 \times m + f_2 \times n) \bmod 3$

Intra-Row Permutation Using Time Parameter as Masking Value $$R[n, m, t, \text{Cell\_ID}] = s \times N_{DRU} + P_s[n] + \text{Coeff}(\text{Cell\_ID}) \times t) \bmod N_{DRU} \quad \text{[Equation 12]}$$

where $s = (f_1 \times m + f_2 \times n) \bmod 3$

E. Generation of Permutation Sequence Using Cell-Specific Shift/Masking, Time-Variant Intra-Row Permutation, and Time-Invariant Intra-Column Permutation If the base permutation sequence P[•] for intra-row permutation is a cell-common permutation sequence, it may be contemplated that one or more shift or masking values based on a cell ID are applied to the intra-row permutation.

Intra-Row Permutation Using Time and Cell-Specific Parameter as Shift Value $$R[n, m, t, \text{Cell\_ID}] = s \times N_{DRU} + P_{(s+t+SM(\text{Cell\_ID}))}[n] \quad \text{[Equation 13]}$$

where $s = (f_1 \times m + f_2 \times n) \bmod 3$

Intra-Row Permutation Using Time and Cell-Specific Parameter as Masking Value $$R[n, m, t, \text{Cell\_ID}] = s \times N_{DRU} + (P_s[n] + t + SM(\text{Cell\_ID})) \bmod N_{DRU} \quad \text{[Equation 14]}$$

where $s = (f_1 \times m + f_2 \times n) \bmod 3$

In [Equation 13] and [Equation 14], SM(Cell_ID) denotes a cell-specific shift or masking value.

F. Generation of Permutation Sequence using Cell-Specific Shift/Masking, Cell-Specific Time-Variant Intra-Row Permutation, and Time-Invariant Intra-Column Permutation If the base permutation sequence P[•] for intra-row permutation is a cell-common permutation pattern, it may be contemplated that one or more shift or masking values based on a cell ID are applied to the intra-row permutation. In this case, a cell-specific shift/masking value and a cell-specific time parameter may be used together for the intra-row permutation.

Intra-Row Permutation Using Time and Cell-Specific Parameter as Shift Value $$R[n, m, t, \text{Cell\_ID}] = s \times N_{DRU} + P_{(s+\text{Coeff}(\text{Cell\_ID}) \times t + SM(\text{Cell\_ID}))}[n] \quad \text{[Equation 15]}$$

where $s = (f_1 \times m + f_2 \times n) \bmod 3$

Intra-Row Permutation Using Time and Cell-Specific Parameter as Masking Value $$R[n, m, t, \text{Cell\_ID}] = s \times N_{DRU} + (P_s[n] + \text{Coeff}(\text{Cell\_ID}) \times t + SM(\text{Cell\_ID})) \bmod N_{DRU} \quad \text{[Equation 16]}$$

where $s = (f_1 m + f_2 \times n) \bmod 3$

EXAMPLE 2-2

Permutation of Distributed Resources using Sequence

Unless otherwise specified, like reference characters denote the same, while some reference characters are defined in different meanings.

In an uplink FP, each DRU is divided into three tiles, each tile including 6 subcarriers by $N_{sym}$ symbols. $N_{sym}$ represents the number of symbols included in a subframe. To achieve a diversity gain from allocated resources, the tiles of the FP are collectively tile-permuted. For example, an inner permutation for allocating the physical tiles of a DRU to logical tiles for a subchannel may be performed by the following equation.

$$\text{Tile}(s,n,t) = L_{DRU,FPi} \times f(n,s) + g(\text{PermSeq}(\ )s,n,t) \text{ or }$$
$$\text{Tile}(s,n,t) = \{L_{DRU,FPi} \times f(n,s) + g(\text{PermSeq}(\ ),s,n,t) + UL\_\text{PermBase}\} \bmod \{3 \times L_{DRU,FPi}\} \quad \text{[Equation 17]}$$

where Tile(s,n,t) denotes the physical tile index of an $n^{th}$ tile in an $s^{th}$ DLRU of a $t^{th}$ subframe. The logical tile index n of a DLRU ranges from 0 to 2. $L_{DRU,FPi}$ denotes the number of DRUs in an $i^{th}$ FP. f(n,s) is a function having values [0, 2]. g(PermSeq( ),s,n,t) denotes a permutation sequence of length $L_{DRU,FPi}$. For example, g(PermSeq( ),s,n,t) may be a permutation sequence having values [0, $L_{DRU,FPi}-1$]. That is, each element of g(PermSeq( ),s,n,t) may have one of the values [0, $L_{DRU,FPi}-1$]. g(PermSeq( ),s,n,t) may be obtained by modifying a base sequence PermSeq( ) with the at least one of parameters s, n and t. PermSeq( ) denotes a base permutation sequence of length $L_{DRU,FPi}$. For example, PermSeq( ) may be a permutation sequence having values [0, $L_{DRU,FPi}-1$]. That is, each element of PermSeq( ) may have one of the values [0, $L_{DRU,FPi}-1$]. PermSeq( ) may be acquired by a known random sequence generation method. For instance, PermSeq( ) may be computed by an AEPS generation method. UL_PermBase denotes an integer equal to or greater than 0, which may be replaced with Cell_ID or a value related to Cell_ID.

f(n,s) may be defined as $$f(n,s) = (f_1 \times n + f_2 \times s) \bmod 3$$

$$f(n,s) = (5n + 7s) \bmod 3,$$

$$f(n,s) = (n + 13s) \bmod 3,$$

$$f(n,s) = (n + 17s) \bmod 3, \text{ or}$$

$$f(n,s) = n \quad \text{[Equation 18]}$$

where $f_1$ is a positive integer that is prime for 3, $f_2$ is 0 or a positive integer that is prime for 3, and n, s and mod have been defined before.

g(PermSeq( ),s,n,t) may be defined as $$g(\text{PermSeq}(\ ),s,n,t) = \text{PermSeq}(\{f(n,s) + s + t\} \bmod \{L_{DRU,FPi}\}, \text{ or}$$

$$g(\text{PermSeq}(\ ),s,n,t) = \{\text{PermSeq}(\{f(n,s) + s + t\} \bmod \{L_{DRU,FPi}\}) + UL\_\text{PermBase}\} \bmod \{L_{DRU,FPi}\} \quad \text{[Equation 19]}$$

where f(n,s), PermSeq( ), n, s, t, $L_{DRU,FPi}$ and mod have been defined before.

PermSeq( ) may be defined as follows.

$$\text{PermSeq}(i) = \left\{ D_{SP} \times i + O_{SP} + \left\lfloor i \cdot \frac{GCD(L_{DRU,FPi}, D_{SP})}{L_{DRU,FPi}} \right\rfloor \right\} \bmod L_{DRU,FPi} \quad \text{[Equation 20]}$$

$$(i = 0 \sim L_{DRU,FPi} - 1)$$

where $D_{SP}$ determines the spacing between tiles with logically contiguous indexes in a sequence and $O_{SP}$ determines the start position of a tile (i.e. offset) in the sequence. $D_{SP}$ and $O_{SP}$ each may be defined as a funcrion of Cell_ID and $L_{DRU,FPi}$. For example, $D_{DP}$ and $O_{SP}$ may be defined as $$D_{SP} = \{Cell\_ID\} \mod\{L_{DRU,FPi}-1\}+1 \text{ and } O_{SP} = \left\lfloor \frac{Cell\_ID}{(L_{DRU,FPi}-1)} \right\rfloor + 1, \quad \text{[Equation 21]}$$

$$D_{SP} = \{SEED\} \mod\{L_{DRU,FPi}-1\}+1 \text{ and } O_{SP} = \left\lfloor \frac{SEED}{(L_{DRU,FPi}-1)} \right\rfloor + 1,$$

or $$D_{SP} = f(SEED) \text{ and } O_{SP=g}(SEED)$$

where SEED may be computed by a function having Cell_ID as an element (SEED=p(Cell_ID)). For example, SEED={Cell_ID×prime number}mod{$2^{number\ of\ SEED\ bits}$}. f(SEED) and g(SEED) each represent a function having SEED as an element. For example, f(SEED)=floor(SEED/$2^5$)+1 and g(SEED)={SEED}mod{$2^5$}. floor( ) represents a floor function that returns the value of the expression between the brackets rounded down to the nearest integer.

$D_{SP}$ may be exchanged with $O_{SP}$. In $D_{SP}$ and $O_{SP}$, $L_{DRU,Fpi}-1$ may be replaced with $L_{DRU,FPi}$. +1 may be omitted from the ends of the equations of $D_{SP}$ and $O_{SP}$.

FIG. 16 illustrates simulation results of Example 2-2. In FIG. 16, the horizontal axis represents Signal-to-Noise ratio (SNR) and the vertical axis represents Packet Error Rate (PER).

The simulation was performed under the following conditions of:
uplink transmission, TDD mode, downlink:uplink=6:2
short TTI=1 subframe, long TTI=2 subframes
10 MHz, 1024 FFT, 2.4 GHz
single LRU (narrow band uplink allocation)
number of BS antennas=2, number of UE antennas=1
Multiple Input Multiple Output (MIMO) mode=1 (SM, Mt=1)
tile-based DRUs (subband allocation number=0, number of DRUs=48)
ITU mPed-B channel model (3 kmph)
Minimum Mean Square Error (MMSE) receiver Referring to FIG. 16, it is noted that PER 4% is achieved at an SNR of about 8.7 dB in case of a short TTI. Meanwhile, when time-variant permutation is performed on a subframe basis according to the embodiment of the present invention, PER 4% is achieved at an SNR of about 8 dB in case of a long TTI. That is, the time-variant permutation increases a diversity gain as tiles are randomly distributed across a frequency area in a time-variant form.

EXAMPLE 2-3

Permutation of Distributed Resources using Sequence

When a narrowband uplink allocation (e.g. one LRU) is carried out in a long TTI, a conventional random sequence generation method may suffer from frequency diversity loss.

FIG. 17 illustrates an exemplary output result of a random sequence generation function. Referring to FIG. 17, when a plurality of cell-specific sequences are generated, part of the sequences may be arranged partially overlapped between cells, or sequentially. Then a frequency diversity gain may be lost.

Figure 18:
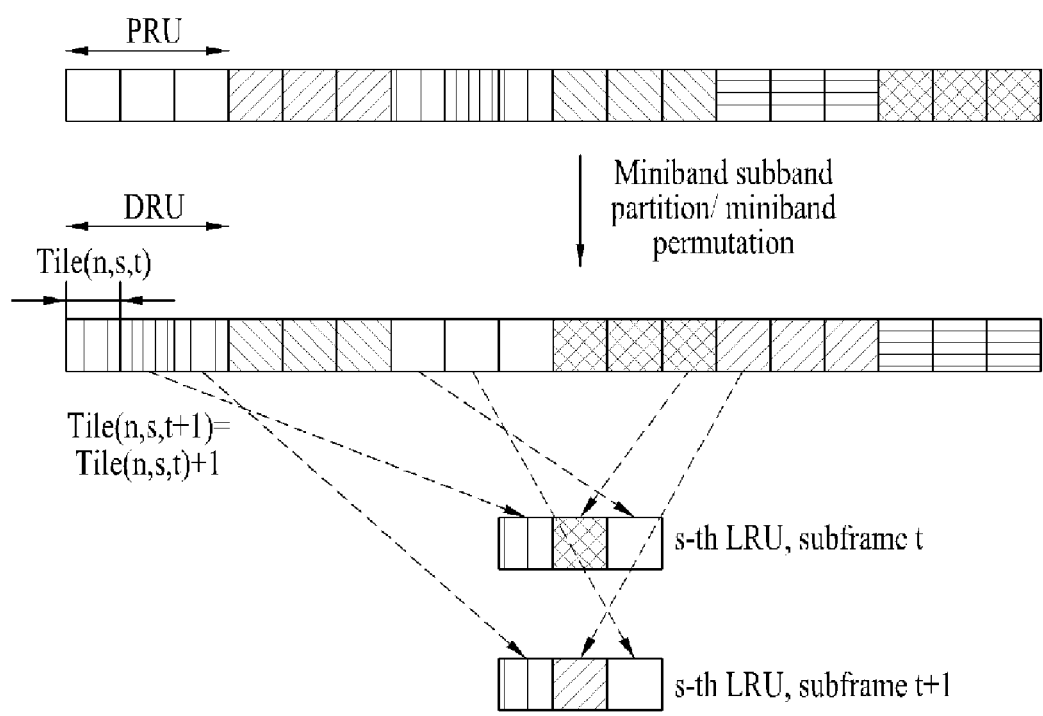
FIG. 18 illustrates an exemplary diversity loss that may occur when uplink resources are allocated.

FIG. 18 illustrates an exemplary diversity loss that may occur when uplink resources are allocated. Referring to FIG. 18, the same logical tiles in $n^{th}$ LRUs of two adjacent subframes, subframe t and subframe t+1 may be neighboring to each other in a physical area. That is, physical tiles and logical tiles may be placed in the following relationship.

$$|Tile(s,n,t)-Tile(s,n,t+1)|=|g(PermSeq(\ ),s,n,t)-g(PermSeq(\ ),s,n,i+1)|=1 \quad \text{[Equation 22]}$$

where Tile(s,n,t) denotes the physical tile index of an $n^{th}$ tile in an $s^{th}$ DLRU of a $t^{th}$ subframe. g(PermSeq( ),s,n,t) denotes a permutation sequence of length $L_{DRU,FPi}$ having values [0, $L_{DRU,FPi}-1$]. Details of Tile(s,n,t) and g(PermSeq( ),s,n,t) have been defined before.

As described above, when the same logical tiles in $n^{th}$ LRUs of two adjacent subframes, subframe t and subframe t+1, are neighboring to each other in a physical area, the neighboring physical tiles may be placed in the same DRU. In this case, PRUs used for uplink transmission may be physically adjacent to each other, thereby causing diversity loss.

To avert the above problem, permutation may be further randomized. To this end, the permutation sequence described in [Equation 19] in Example 2-3 may be replaced with the following equation.

$$g(PermSeq(\ ),s,n,t)=PermSeq(\{f(n,s)+s+h(cell\_ID,L_{DRU,FPi})\times t\}\mod\{L_{DRU,FPi}\}), \text{ or}$$

$$g(PermSeq(\ ),s,n,t)=\{PermSeq(\{f(n,s)+s+h(cell\_ID,L_{DRU,FPi})\times t\}\mod\{L_{DRU,FPi}\})+UL\_PermBase\}\mod\{L_{DRU,FPi}\} \quad \text{[Equation 23]}$$

where f(n,s), PermSeq( ),n, s, t, $L_{DRU,FPi}$, and mod have been defined before. h(cell_ID,$L_{DRU,FPi}$) represents a function of a cell ID and $L_{DRU,FPi}$. For example, h(cell_ID, $L_{DRU,FPi}$) may be a prime number (e.g., 107, 1213, etc.), $D_{SP}$, $O_{SP}$ or UL_PermBase. $D_{SP}$ and $O_{SP}$ have been defined before.

Permutation patterns may be diversified over time by additionally multiplying the time parameter used for generation of a permutation sequence by a predetermined function, as described above.

FIG. 19 illustrates simulation results of Example 2-3. In FIG. 19, the horizontal axis represents SNR and the vertical axis represents PER. The simulation was performed under the same conditions for the simulation of FIG. 16.

Referring to FIG. 19, it is noted that in case of a long III, while time-variant interleaving 1 achieves PER 4% at an SNR of about 8.3 dB, time-variant interleaving_2 achieves PER 4% at an SNR of about 8 dB. Time-variant interleaving 1 is a case of multiplying the time parameter by no value as in Example 2-2 and Time-variant interleaving 2 is a case of multiplying the time parameter by a prime number according to the scheme of Example 2-3. As the simulation reveals, diversification of the time parameter may lead to an increased diversity gain. Particularly when a signal is transmitted by narrowband uplink allocation (e.g. one LRU) and a long TTI, the scheme of Example 2-3 may be preferable.

Figure 20:
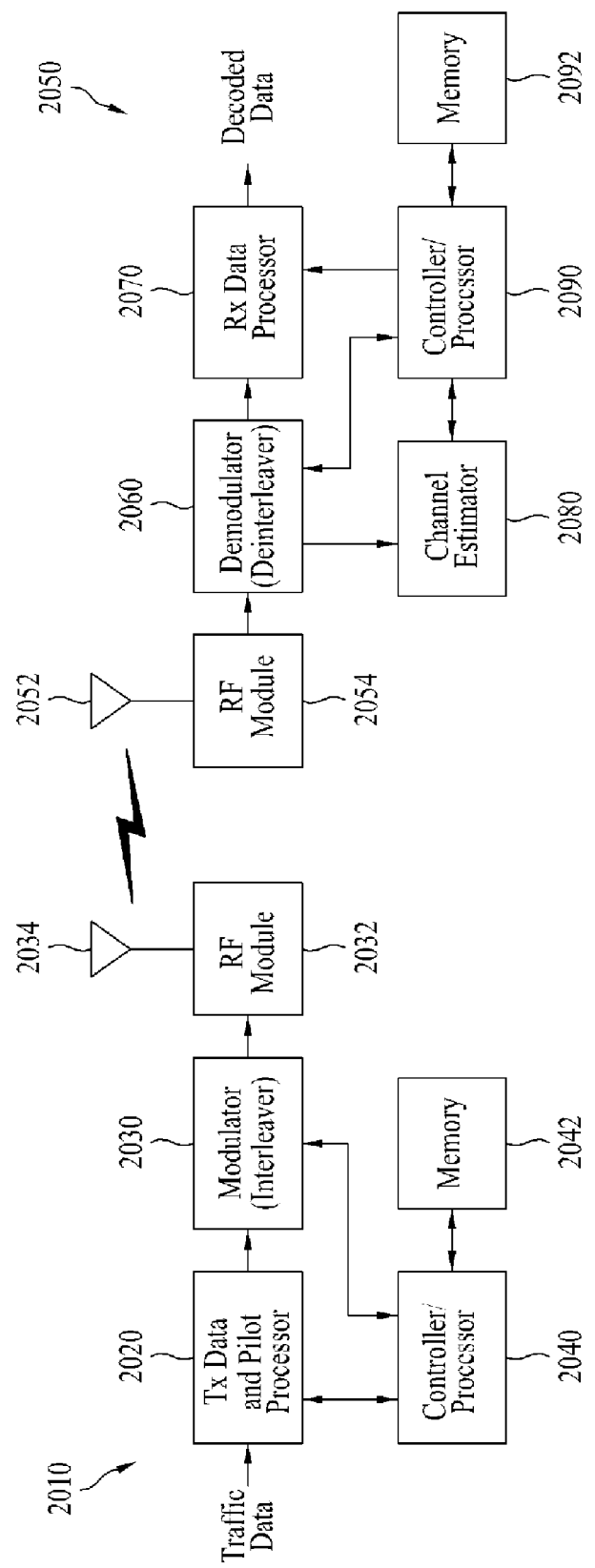
FIG. 20 is a block diagram of a transmitter and a receiver according to an embodiment of the present invention.

FIG. 20 is a block diagram of a transmitter and a receiver according to an embodiment of the present invention. A transmitter 2010 is part of a BS and a receiver 2050 is part of a UE on a downlink, whereas the transmitter 2010 is part of the UE and the receiver 2050 is part of the BS on an uplink.

Referring to FIG. 20, in the transmitter 2010, a Transmission (Tx) data and pilot processor 2020 generates data symbols by subjecting data (e.g. traffic data and signaling information) to encoding, interleaving, and symbol mapping. The Tx data and pilot processor 2020 also generates pilot symbols and multiplexes the data symbols with the pilot symbols. A modulator 2030 generates transmission symbols according to a radio access scheme. The radio access scheme may be FDMA, TDMA, CDMA, SC-FDMA, MC-FDMA, OFDMA, or a combination of them. Also, the modulator 2030 distributes the data over time and frequency areas, for transmission, by various permutation schemes according to embodiments of the present invention. An RF module 2032 generates an RF signal by processing the transmission symbols (e.g. digital-to-analog conversion, amplification, filtering, and frequency upconversion) and transmits the RF signal through an antenna 2034.

In the receiver 2050, an antenna 2052 receives a signal from the transmitter 2010 and provides the received signal to an RF module 2054. The RF module 2054 provides input samples to a demodulator 2060 by processing the received signal (e.g., filtering, amplification, frequency downconversion, and analog-to-digital conversion). The demodulator 2060 acquires data values and pilot values by demodulating the input samples. A channel estimator 2080 performs channel estimation using the pilot values received from the demodulator 2060. Also, the demodulator 2060 detects (or equalizes) data from the data values using the channel estimate and outputs data symbol estimates. The demodulator 2060 may also reorder data distributed across time and frequency areas in their original order by de-permutation corresponding to the various permutation schemes according to the embodiments of the present invention. A Reception (Rx) data processor 2070 symbol-demaps, deinterleaves, and decodes the data symbol estimates. In general, the demodulator 2060 and the Rx data processor 2070 of the receiver 2050 operate complimentarily with the modulator 2030 and the Tx data and pilot processor 2020 of the transmitter 1910, respectively.

Controllers/processors 2040 and 2090 manage and control the operations of various processing modules in the transmitter 2010 and the receiver 2050, respectively.

Memories 2042 and 2092 store program codes and data used for the transmitter 2010 and the receiver 2050, respectively.

The modules illustrated in FIG. 20 are meant for illustrative purposes. The transmitter and/or the receiver may further include a necessary module, some of the modules/functions of the transmitter and/or the receiver may be omitted, a single module may be separated into different modules, and two or more modules may be incorporated into a single module.

As is apparent from the above description, embodiments of the present invention have the following effects.

First of all, a method and apparatus for transmitting a signal in a wireless communication system are provided.

Secondly, a method and apparatus for performing permutation to increase a diversity gain during signal transmission are provided.

The present invention is applicable to a wireless communication system. Particularly, the present invention is applicable to a method and apparatus for transmitting a signal in a wireless communication system.

Exemplary embodiments described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an exemplary embodiment of the present invention or included as a new claim by a subsequent amendment after the application is filed.

In exemplary embodiments of the present invention, a description is made of a data transmission and reception relationship between a BS and a UE. In some cases, a specific operation described as performed by the BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'eNode B' (eNB), 'access point', etc. The term 'UE' may be replaced with the term 'Mobile Station (MS)', 'Mobile Subscriber Station' (MSS), 'mobile terminal', etc.

Exemplary embodiments of the present invention may be achieved by various means, for example, hardware, firmware, software, or a combination thereof. In a hardware configuration, embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, embodiments of the present invention may be implemented in the form of a module, a procedure, a function, etc. performing the above-described functions or operations. A software code may be stored in a memory unit and executed by a processor. The memory unit is located at the interior or exterior of the processor and may transmit and receive data to and from the processor via various known means.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for transmitting a signal by a mobile station in a wireless communication system, the method comprising:

configuring distributed resources across a plurality of contiguous subframes; and transmitting the signal through the distributed resources to a base station, the distributed resources are permutated in each subframe and permutation pattern is different for each subframe: and wherein the permutation pattern is obtained by using the following equation, $$\mathrm{Tile}(s,n,t) = L_{DRU,FPi} \times n + g(\mathrm{PermSeq}(\,),s,n,t)$$

where Tile(s,n,t) denotes a tile index of an $n^{th}$ tile in an $s^{th}$ Distributed Logical Resource Unit (DLRU) of a $t^{th}$ subframe, $L_{DRU,FPi}$ denotes a number of Distributed Resource Units (DRUs) in an $i^{th}$ frequency partition, and g(PermSeq( ), s,n,t) denotes a function which uses PermSeq( ), s, n and t as parameters denoting a permutation sequence of length $L_{DRU,FPi}$, and UL_PermBase being set to a value related to cell ID.

2. The method according to claim 1, wherein the distributed resources include one or more Distributed Resource Units (DRUs) and the permutation is performed on a tile basis in a subframe.

3. The method according to claim 1, wherein the permutation pattern is set to be different for each subframe using a subframe index.

4. The method according to claim 1, wherein the permutation pattern is set to be different for each subframe using a product between a subframe index and a prime number.

5. The method according to claim 1, wherein the permutation pattern is obtained by using a permutation sequence of length $L_{DRU,FPi}$,
wherein the permutation sequence of length $L_{DRU,FPi}$ is cyclic shifted or masked by using a subframe index, and wherein $L_{DRU,FPi}$ denotes the number of DRUs in an $i^{th}$ frequency partition.

6. The method according to claim 1, wherein the permutation pattern is obtained by using at least one of time-variant intra-row permutation and time-variant intra-column permutation.

7. A mobile station comprising:
a Radio Frequency (RF) module for transmitting a signal to a base station; and
a processor for generating the signal,
wherein the processor is adapted to configure distributed resources across a plurality of contiguous subframes, and to transmit the signal through distributed resources to the base station,
wherein the distributed resources are permutated in each subframe and permutation pattern is different for each subframe, and
wherein the permutation pattern is obtained by using the following equation, $$\text{Tile}(s,n,t) = L_{DRU,FPi} \times n + g(\text{PermSeq}(\ ),s,n,t)$$

where Tile(s,n,t) denotes a tile index of an $n^{th}$ tile in an $s^{th}$ Distributed Logical Resource Unit (DLRU) of a $t^{th}$ subframe,
$L_{DRU,FPi}$ denotes a number of Distributed Resource Units (DRUs) in an $i^{th}$ frequency partition, and
g(PermSeq( ), s,n,t) denotes a function which uses PermSeq( ), s, n and t as parameters denoting a permutation sequence of length $L_{DRU,FPi}$, and UL_PermBase being set to a value related to cell ID.

8. The mobile station according to claim 7, wherein the distributed resources include one or more Distributed Resource Units (DRUs) and the permutation is performed on a tile basis in a subframe.

9. The mobile station according to claim 7, wherein the permutation pattern is set to be different for each subframe using a subframe index.

10. The mobile station according to claim 7, wherein the permutation pattern is set to be different for each subframe using a product between a subframe index and a prime number.

11. The mobile station according to claim 7, wherein the permutation pattern is obtained by using a permutation sequence of length $L_{DRU,FPi}$,
wherein the permutation sequence of length $L_{DRU,FPi}$ is cyclic shifted or masked by using a subframe index, and wherein $L_{DRU,FPi}$ denotes the number of DRUs in an $i^{th}$ frequency partition.

12. The mobile station according to claim 7, wherein the permutation pattern is obtained by using at least one of time-variant intra-row permutation and time-variant intra-column permutation.

13. A method for processing a signal by a base station in a wireless communication system, the method comprising:
receiving the signal through distributed resources configured in a plurality of contiguous subframes from a mobile station;
de-permutating the distributed resources in each subframe; and
obtaining data from the de-permutated distributed resources,
wherein permutation pattern of the distributed resources is different for each subframe, and
wherein the permutation pattern is obtained by using the following equation, $$\text{Tile}(s,n,t) = L_{DRU,FPi} \times n + g(\text{PermSeq}(\ ),s,n,t)$$

where Tile(s,n,t) denotes a tile index of an $n^{th}$ the in an $s^{th}$ Distributed Logical Resource Unit (DLRU) of a $t^{th}$ subframe,
$L_{DRU,FPi}$ denotes a number of Distributed Resource Units (DRUs) in an $i^{th}$ frequency partition, and
g(PermSeq( ), s,n,t) denotes a function which uses PermSeq( ), s, n and t as parameters denoting a permutation sequence of length $L_{DRU,FPi}$, and UL_PermBase being set to a value related to cell ID.

14. The method according to claim 13, wherein the distributed resources include one or more Distributed Resource Units (DRUs) and the permutation is performed on a tile basis in a subframe.

15. The method according to claim 13, wherein the permutation pattern is set to be different for each subframe using a subframe index.

16. The method according to claim 13, wherein the permutation pattern is set to be different for each subframe using a product between a subframe index and a prime number.

17. The method according to claim 13, wherein the permutation pattern is obtained by using a permutation sequence of length $L_{DRU,FPi}$,
wherein the permutation sequence of length $L_{DRU,FPi}$ is cyclic shifted or masked by using a subframe index, and wherein $L_{DRU,FPi}$ denotes the number of DRUs in an $i^{th}$ frequency partition.

18. The method according to claim 13, wherein the permutation pattern is obtained by using at least one of time-variant intra-row permutation and time-variant intra-column permutation.

19. A base station comprising:
a Radio Frequency (RF) module for receiving a signal from a mobile station; and
a processor for processing the signal,
wherein the processor is configured to receive the signal through distributed resources configured in a plurality of contiguous subframes from the mobile station, to de-permutate the distributed resources in each subframe, and to obtain data from the de-permutated distributed resources,
wherein permutation pattern of the distributed resources is different for each subframe, and
wherein the permutation pattern is obtained by using the following equation, $$\text{Tile}(s,n,t) = L_{DRU,FPi} \times n + g(\text{PermSeq}(\ ),s,n,t)$$

where Tile(s,n,t) denotes a tile index of an $n^{th}$ tile in an $s^{th}$ Distributed Logical Resource Unit (DLRU) of a $t^{th}$ subframe,
$L_{DRU,FPi}$ denotes a number of Distributed Resource Units (DRUs) in an $i^{th}$ frequency partition, and g(PermSeq( ), s,n,t) denotes a function which uses PermSeq( ), s, n and t as parameters denoting a permutation sequence of length $L_{DRU,FPi}$, and UL_PermBase being set to a value related to cell ID.

20. The base station according to claim 19, wherein the distributed resources include one or more Distributed Resource Units (DRUs) and the permutation is performed on a tile basis in a subframe.

21. The base station according to claim 19, wherein the permutation pattern is set to be different for each subframe using a subframe index.

22. The base station according to claim 19, wherein the permutation pattern is set to be different for each subframe using a product between a subframe index and a prime number.

23. The base station according to claim 19, wherein the permutation pattern is obtained by using a permutation sequence of length $L_{DRU,FPi}$,
   wherein the permutation sequence of length $L_{DRU,FPi}$ is cyclic shifted or masked by using a subframe index, and
   wherein $L_{DRU,FPi}$ denotes the number of DRUs in an $i^{th}$ frequency partition.

24. The base station according to claim 19, wherein the permutation pattern is obtained by using at least one of time-variant intra-row permutation and time-variant intra-column permutation.

* * * * *